US011211968B2

(12) United States Patent
Jang et al.

(10) Patent No.: US 11,211,968 B2
(45) Date of Patent: Dec. 28, 2021

(54) ELECTRONIC DEVICE AND METHOD TO CONTROL COMMUNICATION CIRCUIT IN ELECTRONIC DEVICE

(71) Applicant: Samsung Electronics Co., Ltd., Gyeonggi-do (KR)

(72) Inventors: Kyujae Jang, Gyeonggi-do (KR); Jungsik Min, Gyeonggi-do (KR); Youngsik Byun, Gyeonggi-do (KR); Hyoungtak Son, Gyeonggi-do (KR); Kyungrok Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/026,476

(22) Filed: Sep. 21, 2020

(65) Prior Publication Data
US 2021/0105039 A1 Apr. 8, 2021

(30) Foreign Application Priority Data
Oct. 2, 2019 (KR) .......................... 10-2019-0122128

(51) Int. Cl.
*H04B 1/525* (2015.01)
*H04B 1/401* (2015.01)
*H04B 1/00* (2006.01)

(52) U.S. Cl.
CPC ........... *H04B 1/525* (2013.01); *H04B 1/0064* (2013.01); *H04B 1/401* (2013.01)

(58) Field of Classification Search
CPC ....... H04B 1/525; H04B 1/0064; H04B 1/401
See application file for complete search history.

(56) References Cited

U.S. PATENT DOCUMENTS

| 5,196,808 A * | 3/1993 | Pickett | H03F 1/52 |
| | | | 330/207 P |
| 2005/0208907 A1* | 9/2005 | Yamazaki | H04B 1/0483 |
| | | | 455/126 |
| 2007/0026838 A1 | 2/2007 | Staudinger et al. | |
| 2008/0058026 A1 | 3/2008 | Jeong | |

(Continued)

FOREIGN PATENT DOCUMENTS

| KR | 10-2003-0054166 A | 7/2003 |
| KR | 10-2005-0058944 A | 6/2005 |

(Continued)

OTHER PUBLICATIONS

International Search Report dated Dec. 23, 2020.

*Primary Examiner* — Nguyen T Vo
(74) *Attorney, Agent, or Firm* — Cha & Reiter, LLC

(57) ABSTRACT

According to one or more embodiments, an electronic device comprises an antenna, a transceiver configured to generate a first signal which corresponds to a first frequency band and transmit the first signal to the antenna, a coupler electrically connected to the antenna and the transceiver, and a communication processor operatively connected to the transceiver, and the communication processor may be configured to identify whether the first signal is abnormal, at least partially based on at least part of the first signal, wherein the at least part of the first signal is a signal fed back through the coupler, and, based on identifying that the first signal is abnormal, control transmission power of the first signal during a set time interval. Other embodiments may be possible.

21 Claims, 18 Drawing Sheets

(56) References Cited

U.S. PATENT DOCUMENTS

| | | |
|---|---|---|
| 2008/0061884 A1 | 3/2008 | Fisher et al. |
| 2013/0141167 A1 | 6/2013 | Kim et al. |
| 2014/0146918 A1* | 5/2014 | Ryan .................... H03F 1/3247 375/297 |
| 2016/0285669 A1* | 9/2016 | Saito ..................... H04L 27/206 |
| 2017/0270263 A1* | 9/2017 | Michihata .............. G16H 30/20 |
| 2019/0165734 A1 | 5/2019 | Lee et al. |

FOREIGN PATENT DOCUMENTS

| | | |
|---|---|---|
| KR | 10-0502415 B1 | 7/2005 |
| KR | 10-2010-0077915 A | 7/2010 |
| KR | 10-2011-0064492 A | 6/2011 |
| KR | 10-2019-0061411 A | 6/2019 |
| KR | 10-2019-0076172 A | 7/2019 |
| WO | 2007/041058 A2 | 4/2007 |

\* cited by examiner

ELECTRONIC DEVICE AND METHOD TO CONTROL COMMUNICATION CIRCUIT IN ELECTRONIC DEVICE

CROSS-REFERENCE TO RELATED APPLICATION(S)

This application is based on and claims priority under 35 U.S.C. § 119 to Korean Patent Application No. 10-2019-0122128, filed on Oct. 2, 2019, in the Korean Intellectual Property Office, the disclosure of which is incorporated by reference herein in its entirety.

BACKGROUND

Field

One or more embodiments of the present disclosure generally relate to an electronic device and a method to control a communication circuit in the electronic device.

Description of Related Art

As mobile communication technologies have developed, portable terminals that provide various functions have become popular. Accordingly, an effort to develop 5G communication system is being made in order to meet increasing wireless data traffic demand. In order to achieve high data transmission rate, the 5G communication system is implemented in a super-high frequency band, in addition to being implemented in the high frequency band used by the 3G communication system and the Long Term Evolution (LTE) communication system. This way, 5G may provide increasingly high data transmission speeds.

As a scheme of implementing a 5G communication, standalone (SA) scheme and non-stand alone (NSA) scheme are considered. The NSA scheme may use new radio (NR) system together with existing LTE systems. In the NSA scheme, user equipment (UE) may use Evolved NodeB (eNB) base stations of LTE systems, in addition to Next Generation NodeB (gNB) base stations in the NR system. The technology that allows a user terminal to operate in different communication systems may be referred to as dual connectivity.

SUMMARY

An electronic device supporting a particular communication system may include a MODEM which may be referred to as a communication processor (CP), transceiver, a front end module (FEM), or an antenna. The FEM may include a power amplifier (PA) and a band pass filter (BPF).

If the electronic device is incapable of generating a normal signal in the desired frequency band due to errors in the MODEM or the transceiver, the PA preceding the band pass filter which is designed for a specific frequency band may be damaged due to reflected waves that fail to pass the band pass filter.

Various embodiments may provide an electronic device and a method to protect an FEM in the electronic device which may prevent damage of a PA occurring due to a reflected wave which fails to pass a band pass filter if the electronic device is incapable of generating normally a signal in a desired frequency band.

According to an embodiment, an electronic device comprises an antenna, a transceiver configured to generate a first signal which corresponds to a first frequency band and transmit the first signal to the antenna, a coupler electrically connected to the antenna and the transceiver, and a communication processor operatively connected to the transceiver, and the communication processor may be configured to identify whether the first signal is abnormal, at least partially based on at least part of the first signal, wherein the at least part of the first signal is a signal fed back through the coupler, and, based on identifying that the first signal is abnormal, control transmission power of the first signal during a set time interval.

According to an embodiment, an electronic device comprises an antenna, a transceiver configured to generate a first signal which corresponds to a first frequency band and transmit the first signal to the antenna, a coupler electrically connected between the antenna and the transceiver, and a communication processor operatively connected to the transceiver, and the communication processor may be configured to identify whether the first signal is abnormal, at least partially based on at least part of the first signal, wherein the at least part of the first signal is a signal fed back through the coupler, and, based on identifying that the first signal is identified to be abnormal, transmit a control signal related to a setting of the transceiver to the transceiver.

According to an embodiment, a method to control a communication circuit in an electronic device may comprise generating, by a transceiver, a first signal which corresponds to a first frequency band and transmitting the first signal to an antenna, receiving at least part of the first signal, wherein the at least part of the first signal is a signal fed back through a coupler electrically connected between the antenna and the transceiver, identifying whether the first signal is abnormal, at least partially based on the at least part of the first signal, and, based on identifying that the first signal is abnormal, adjusting transmission power of the first signal during a set time interval.

According to an embodiment, a method to control a communication circuit in an electronic device may comprise generating, by a transceiver, a first signal which corresponds to a first frequency band and transmitting the first signal to an antenna, receiving at least part of the first signal, wherein the at least part of the first signal is a signal fed back through a coupler electrically connected between the antenna and the transceiver, identifying whether the first signal is abnormal, at least partially based on the at least part of the first signal, and, based on identifying that the first signal is abnormal, transmitting a control signal related to a setting of the transceiver to the transceiver.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
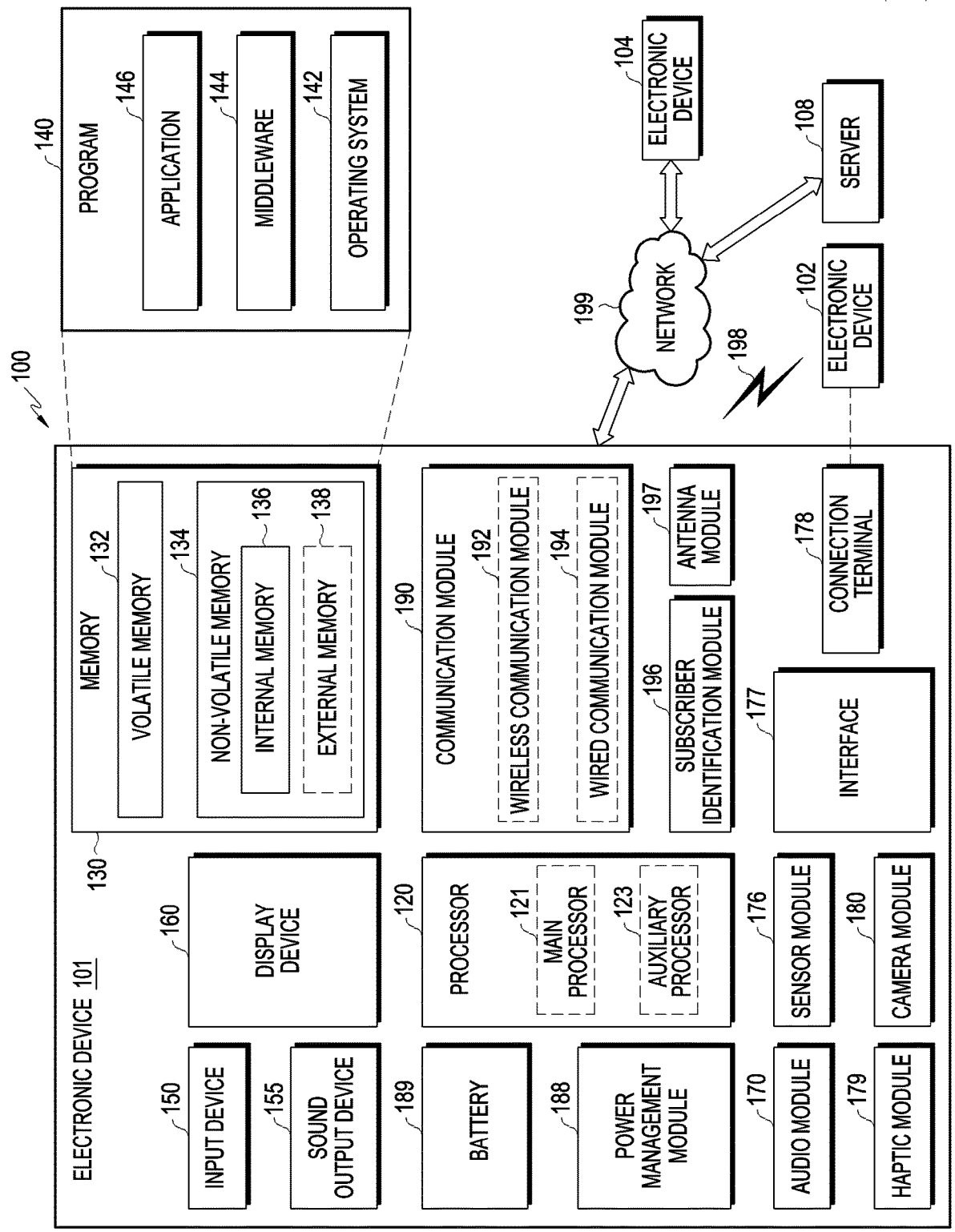
FIG. 1 is a block diagram illustrating an electronic device in a network environment according to various embodiments.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the present disclosure. Further, unless defined otherwise, the technical terms used herein should be interpreted to have the same meaning as those commonly understood by a person skilled in the art to which the present disclosure pertains, and should not be interpreted have excessively comprehensive or excessively restricted meanings unless defined otherwise. Further, when the technical terms used herein are wrong technical terms that cannot correctly represent the idea of the present disclosure, it should be appreciated that they are replaced by technical terms correctly understood by those skilled in the art. Further, the general terms used herein should be interpreted as defined in dictionaries or interpreted in the context of the relevant part, and should not be interpreted to have excessively restricted meanings.

In addition, a singular expression used herein may include a plural expression unless they are definitely different in the context. As used herein, the expression "comprises", "include", and/or the like should not be interpreted to necessarily include all components or all steps described in the specification, and should be interpreted to be allowed to exclude some of them or further include additional components or steps.

The terms including an ordinal number used in the specification, such as expressions "a first" and "a second" may be used to describe various components, but the corresponding components should not be limited by such terms. These terms are used merely to distinguish between one component and any other component. For example, a first component may be termed a second component, and similarly, a second component may be termed a first component without departing from the scope of the present disclosure.

It should be understood that when a component is referred to as being "connected" or "coupled" to another component, it may be connected or coupled directly to the other component, or any other component may be interposer between them. In contrast, it should be understood that when a component is referred to as being "directly connected" or "directly coupled" to another component, there are no component interposed between them.

Hereinafter, exemplary embodiments of the present disclosure will be described in detail with reference to the accompanying drawings. Regardless of drawing signs, the same or like components are provided with the same reference numeral, and a repeated description thereof will be omitted. In describing the present disclosure, descriptions related to technical contents well-known in the art and not associated directly with the present disclosure will be omitted. Further, it should be noted that the accompanying drawings are presented merely to help easy understanding of the present disclosure, and are not intended to limit the present disclosure. The technical idea of the present disclosure should be construed to cover all changes, equivalents, and alternatives, in addition to the drawings.

In the following, a mobile station will be described in the drawings, but the mobile station may be called an electronic device, a terminal, mobile equipment (ME), user equipment (UE), a user terminal (UT), a subscriber station (SS), a wireless device, a handheld device, or an access terminal (AT). Further, the mobile station may be a device capable of communicating, such as a mobile phone, a personal digital assistant (PDA), a smartphone, a wireless modem, and/or a notebook.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
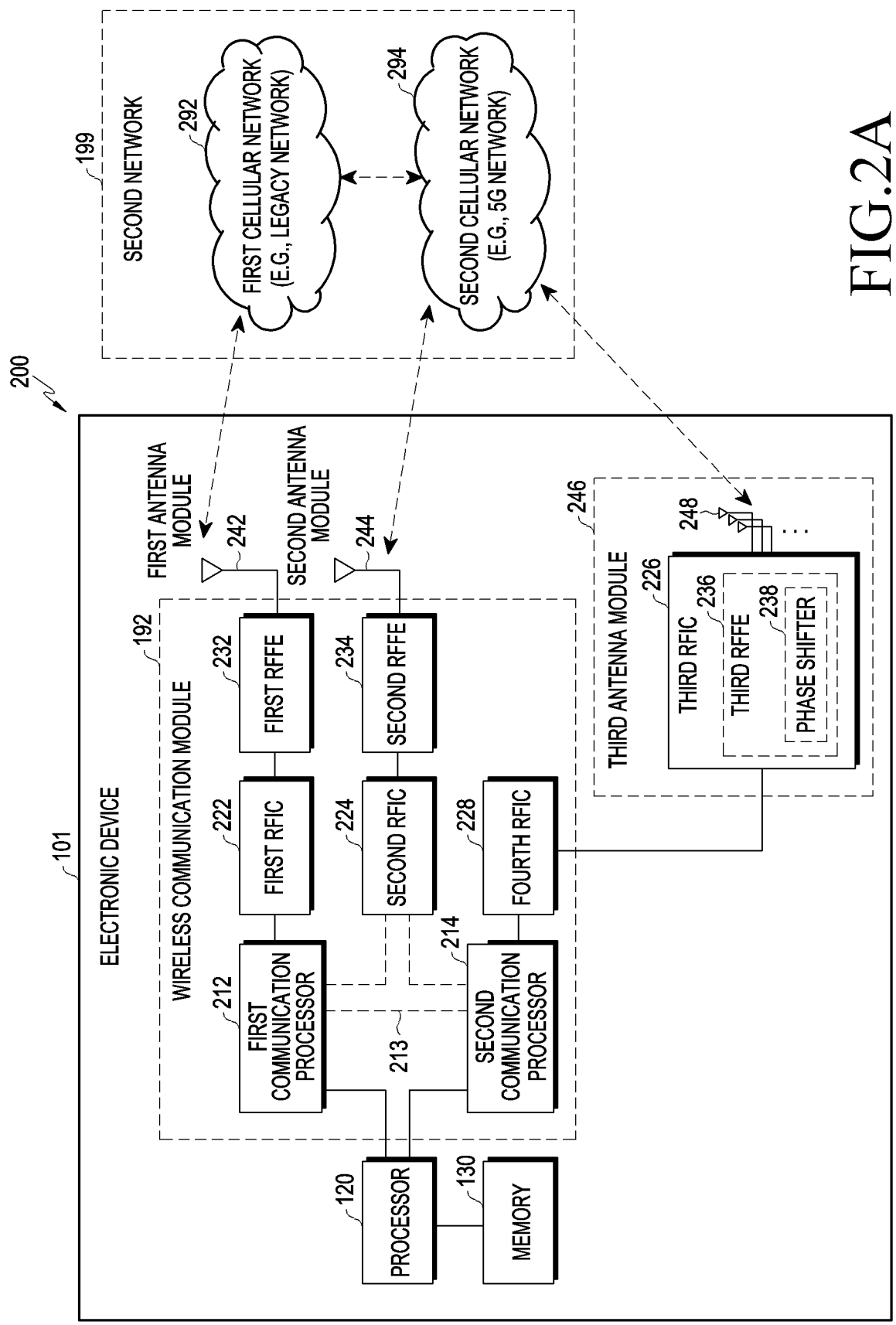
FIG. 2A is a block diagram illustrating an electronic device for supporting a legacy network communication and a 5G network communication according to an embodiment.

FIG. 2A is a block diagram 200 illustrating an electronic device 101 for supporting a legacy network communication and a $5^{th}$ generation (5G) network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment, the electronic device 101 may further include at least one of the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as part of the third RFIC 226.

The first communication processor 212 may establish a communication channel in a band to be used for wireless communication with the first cellular network 292 and support legacy network communication via the established communication channel. According to an embodiment, the first cellular network 292 may be a legacy network such as $2^{nd}$ generation (2G), $3^{rd}$ generation (3G), $4^{th}$ generation (4G), or LTE network. The second communication processor 214 may establish a communication channel corresponding to a specified band (e.g., about 6 GHz to about 60 GHz) among bands used for wireless communication with the second cellular network 294 and support 5G network communication via the established communication channel. According to an embodiment, the second cellular network 294 may be the 5G network defined by the 3GPP. Additionally, according to an embodiment, the first communication processor 212 or the second communication processor 214 may establish a communication channel corresponding to another specified band (e.g., about 6 GHz or less) among bands used for the wireless communication with the second cellular network 294 and support 5G network communication via the established communication channel.

The first communication processor 212 may transmit and receive data to and from the second communication processor 214. For example, data supposed to be transmitted via the second cellular network 294 may be scheduled to be transmitted via the first cellular network 292. In this case, the first communication processor 212 may receive transmission data from the second communication processor 214. For example, the first communication processor 212 may transmit and receive data to and from the second communication processor 214 via a universal asynchronous receiver/transmitter (UART) (e.g., high speed-UART (HS-UART)) or a peripheral component interconnect bus express (PCIe) interface 213. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 via the processor 120 (e.g., an application processor). According to an embodiment, the first communication processor 212 or the second communication processor 214 may transmit and receive data to and from the processor 120 via a shared memory or a PCIe interface.

Figure 2B:
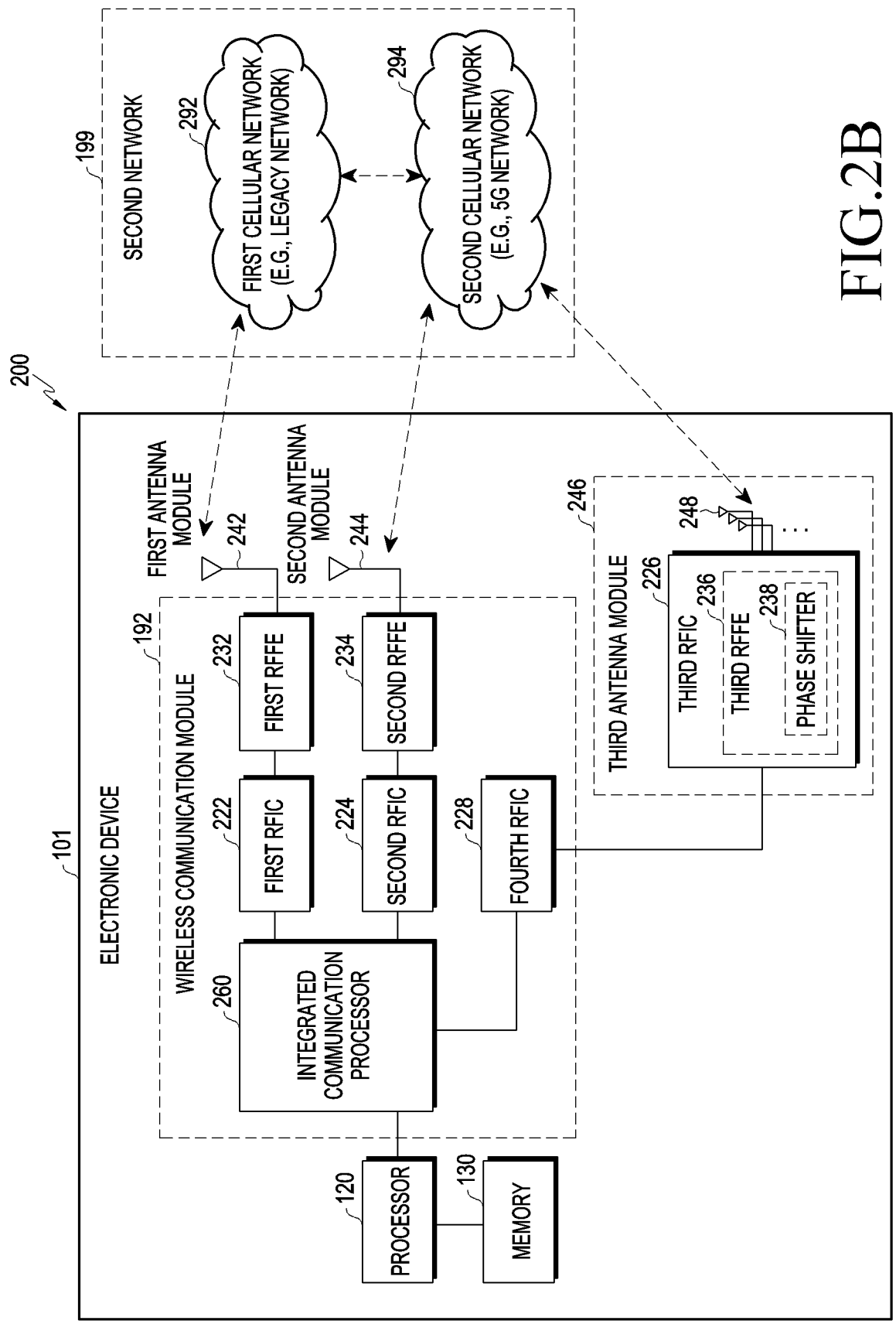
FIG. 2B is a block diagram illustrating an electronic device for supporting a legacy network communication and a 5G network communication according to an embodiment.

According to an embodiment, the first communication processor 212 and the second communication processor 214 may be incorporated in a single chip or a single package. According to an embodiment, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of communication functions with the first cellular network 292 and the second cellular network 294.

For transmission, the first RFIC 222 may convert a baseband signal generated by the first communication processor 212 to an RF signal in about 700 MHz to about 3 GHz used in the first network 292 (e.g., the legacy network). For reception, an RF signal may be obtained from the first network 292 (e.g., the legacy network) via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second network 294 (e.g., the 5G network). For reception, a 5G Sub6 RF signal may be obtained from the second network 294 (e.g., the 5G network) via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second network 294 (e.g., the 5G network). For reception, a 5G Above6 RF signal may be obtained from the second network 294 (e.g., the 5G network) via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) that is different from the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of the transmission line between the third RFIC 226 and the antenna 248. This may reduce, for example, loss (e.g., attenuation) of signals in the high frequency band (e.g., about 6 GHz to about 60 GHz) used for a 5G network communication, on the transmission line. Therefore, the electronic device 101 may increase quality or speed of communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change the phase of the 5G Above6 RF signal to be transmitted out of the electronic device 101 (e.g., to the base station in the 5G network) via a corresponding antenna element. During reception, each of the phase shifters 238 may change the phase of the 5G Above6 RF signal received via a corresponding antenna element to the same or substantially same phase. This enables transmission or reception via beamforming between the electronic device 101 and external devices.

The second network 294 (e.g., the 5G network) may be operated independently of the first network 292 (e.g., the legacy network) (e.g., SA (Stand-Alone)) or in connection to the first network 292 (e.g., the legacy network) (e.g., Non-Stand Alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., Internet) under the control of the core network (e.g., an evolved packet core (EPC)) of the legacy network. Protocol information for communication with the legacy network (e.g., LTE protocol information) and protocol information for communication with the 5G network (e.g., New Radio (NR) protocol information) may be stored in the memory 230 and accessed by another component (e.g., the processor 120, the first communication processor 212, or the second communication processor 214).

Figure 3:
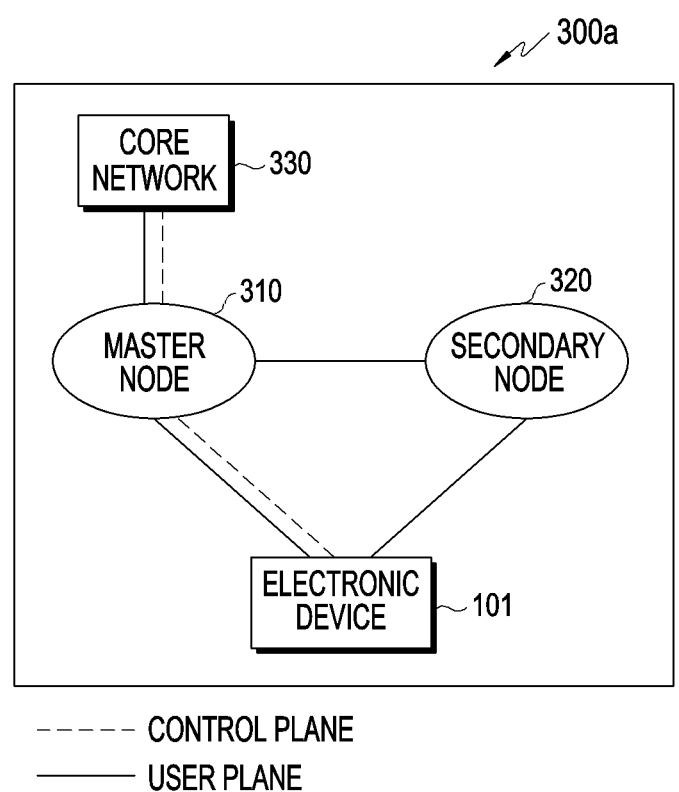
FIG. 3 is a diagram illustrating a wireless communication system which provides a legacy communication network and/or a 5G communication network according to an embodiment.

FIG. 3 is a diagram illustrating wireless communication system which provides a legacy communication network and/or a 5G communication network according to an embodiment. Referring to FIG. 3, a network environment 300a may include at least one of a legacy network or a 5G network. The legacy network in the network environment 300a may include, for example, a 4G or LTE base station (e.g., an eNB or eNodeB) of the 3GPP standard supporting wireless access of the electronic device 101, and an EPC which manages a 4G communication. The 5G network may include, for example, an NR base station (e.g., gNB or gNodeB) supporting wireless access of the electronic device 101, and a 5th generation core (5GC) which manages a 5G communication of the electronic device 101.

According to an embodiment, the electronic device 101 may transmit and receive a control message and user data via the legacy communication and/or 5G communication. The control message may include a message related to at least one of, for example, security control, bearer setup, authentication, registration, or mobility management of the electronic device 101. The user data may refer to, for example, user data except for the control message transmitted and received between the electronic device 101 and the core network 330 (e.g., the EPC). Referring to FIG. 3, the electronic device 101 according to an embodiment may transmit and receive at least one of the control message or user data to and from at least part (e.g., the NR base station and the 5GC) of the 5G network using at least part (e.g., the LTE base station and the EPC) of the legacy network.

According to an embodiment, the network environment 300a may provide wireless communication dual connectivity (DC) to the LTE base station and the NR base station and transmit and receive the control message to and from the electronic device 101 via one core network 330 of the EPC or the 5GC.

According to an embodiment, in a DC environment, one of the LTE base station and the NR base station may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of wireless resources (e.g., communication channels) to and from each other.

According to an embodiment, the MN 310 may include the LTE base station, the SN 320 may include the NR base station, and the core network 330 may include the EPC. For example, a control message may be transmitted and received via the LTE base station and the EPC, and user data may be transmitted via at least one of the LTE base station or the NR base station.

According to an embodiment, the MN 310 may include the NR base station, the SN 320 may include the LTE base station, and the core network 330 may include the 5GC. For example, a control message may be transmitted and received via the NR base station and the 5GC, and user data may be transmitted via at least one of the LTE base station or the NR base station.

According to an embodiment, the electronic device 101 may be registered in at least one of the EPC or the 5GC, and transmit and receive the control message.

According to an embodiment, the EPC and the 5GC may interwork and manage communication of the electronic device 101.

As described above, dual connectivity via the LTE base station and the NR base station may be referred to as E-UTRA new radio dual connectivity (EN-DC).

Figure 4:
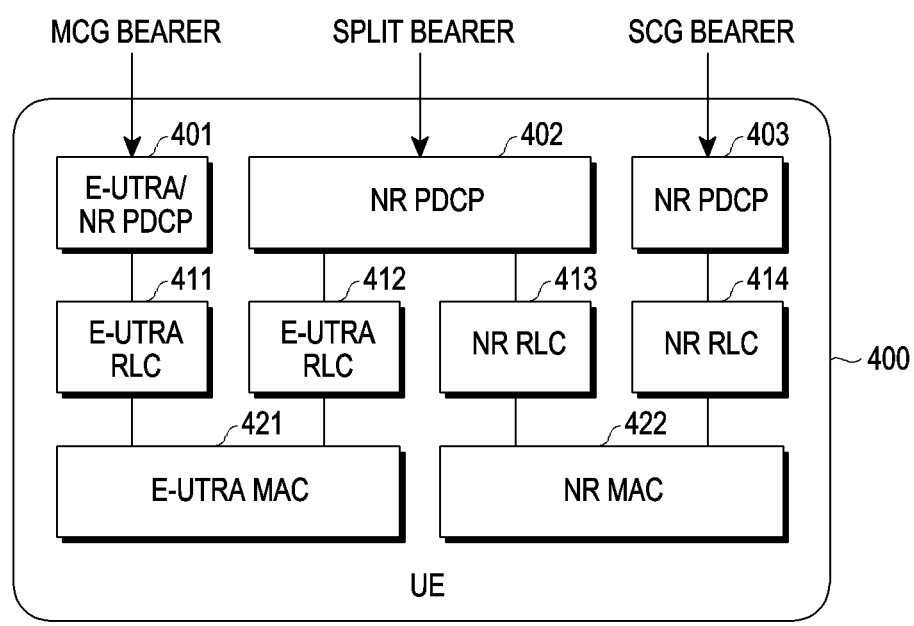
FIG. 4 is a diagram illustrating a bearer at a UE according to an embodiment.

FIG. 4 is a diagram illustrating a bearer at a UE according to an embodiment.

Bearers available in the 5G non-standalone network environment (e.g., the network environment 300a in FIG. 3) may include a master cell group (MCG) bearer, a secondary cell group (SCG) bearer, and a split bearer. An E-UTRA/NR packet data convergence protocol (PDCP) entity 401 and NR PDCP entities 402 and 403 may be configured in the user equipment UE) 400. An E-UTRA radio link control (RLC) entities 411 and 412 and NR RLC entities 413 and 414 may be configured in the UE 400. An E-UTRA MAC entity 421 and an NR MAC entity 422 may be configured in the UE 400. The UE may refer to a user device capable of communicating with a base station and the term may be interchangeably used with "the electronic device 101," for example in FIG. 1. For example, when it is said that the UE performs a specific operation, this may imply that at least one component included in the electronic device 101 performs the specific operation.

The MCG may correspond to, for example, the MN 310 in FIG. 3, and the SCG may correspond to, for example, the SN 320 in FIG. 3. Once a node for performing a particular communication is identified, the UE 400 may configure various entities illustrated in FIG. 4 to communicate with the identified node (e.g., a base station). The entities 401, 402 and 403 of the PDCP layer may receive data (e.g., a PDCP service data unit (SDU) corresponding to an IP packet) and output converted data (e.g., a PDCP protocol data unit (PDU)) in which additional information (e.g., header information) is reflected. The entities 411, 412, 413, and 414 of the RLC layer may receive the converted data (e.g., the PDCP PDU) output from the entities 401, 402 and 403 of the PDCP layer and output converted data (e.g., an RLC PDU) in which additional information (e.g., header information) is reflected. The entities 421 and 422 of the MAC layer may receive the converted data (e.g., the RLC PDU) output from the entities 411, 412, 413, and 414 of the RLC layer and output converted data (e.g., a MAC PDU) in which additional information (e.g., header information) is reflected for a physical layer (not shown).

In dual connectivity (DC), the MCG bearer may be associated with a path (or data) in which data may be transmitted and received only using resource or entities that correspond to the MN. In the dual connectivity, the SCG bearer may be associated with a path (or data) in which data may be transmitted and received only using resource or entities that correspond to the SN. In the dual connectivity, a split bearer may be associated with a path (or data) in which data may be transmitted and received using the resource or the entities that correspond to the MN or the resource or the entities that correspond to the SN. Accordingly, as illustrated in FIG. 4, the split bearer may be associated with the E-UTRA RLC entity 412, the NR RLC entity 413, the E-UTRA MAC entity 421, and the NR MAC entity 422 via the NR PDCP entity 402.

Figure 5A:
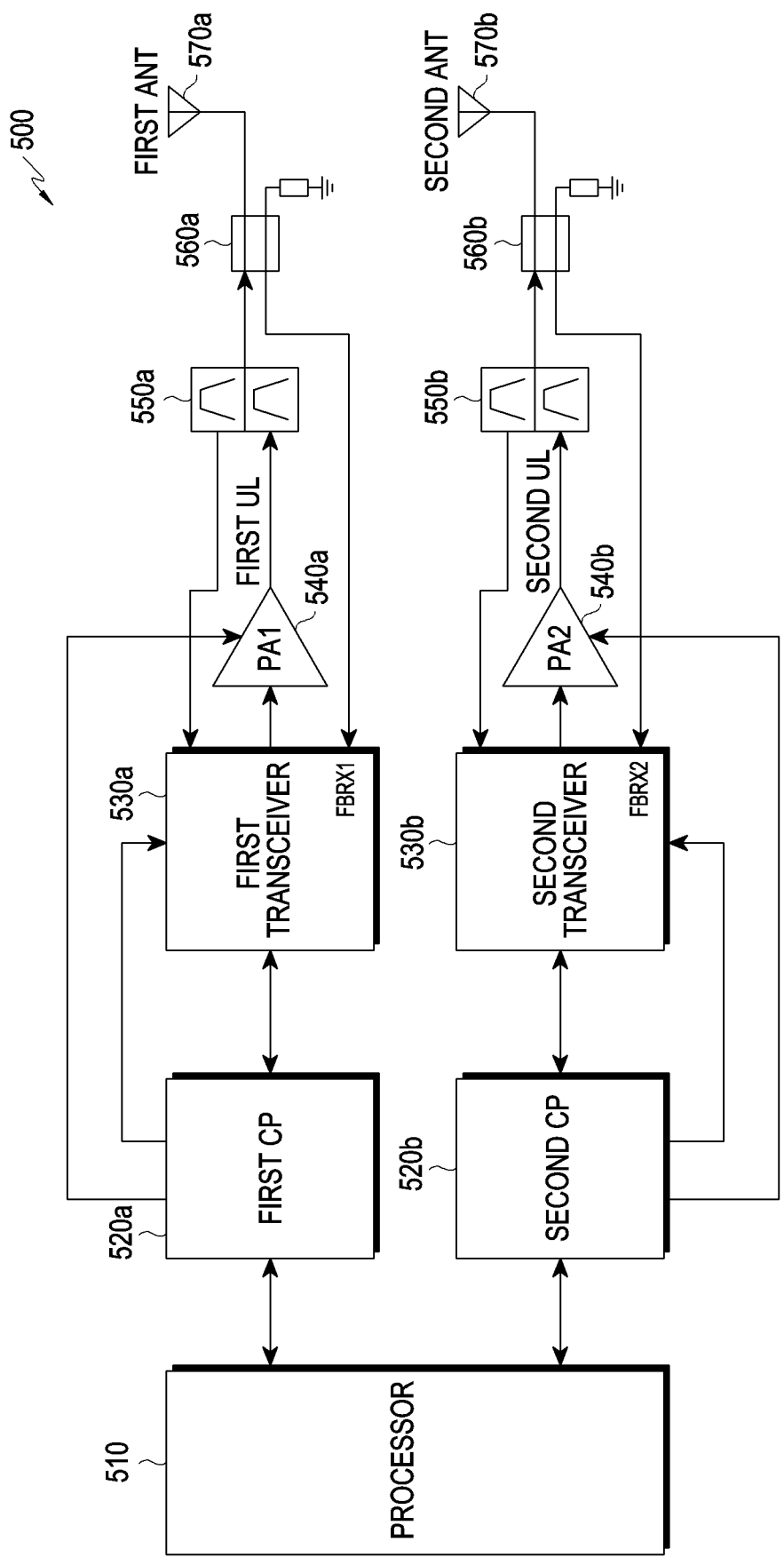
FIG. 5A is a block diagram illustrating an electronic device providing dual connectivity according to an embodiment.

FIG. 5A is a block diagram illustrating an electronic device providing dual connectivity according to an embodiment. Referring to FIG. 5A, an electronic device 500 according to an embodiment may include a processor 510 (e.g., an application processor), a first communication processor 520a (e.g., a first communication processor (CP)), a second communication processor 520b (e.g., a second CP), a first transceiver 530a, a second transceiver 530b, a first power amplifier 540a, a second power amplifier 540b, a first duplexer 550a, a second duplexer 550b, a first coupler 560a, a second coupler 560b, a first antenna 570a, or a second antenna 570b. The electronic device 500 in FIG. 5A may be similar to, or the same as, the electronic device 101 in FIG. 1, FIG. 2A, or FIG. 2B. The processor 510, the first communication processor 520a, and the second communication processor 520b may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 510 may include a controller (or a control circuitry) and a shared memory (e.g., a memory shared by the first communication processor 520a and the second communication processor 520b).

The first communication processor 520a may establish a communication channel in a band to be used for wireless communication with a first communication network, and/or may support a network communication via the established communication channel. According to an embodiment, the first communication network may include 2G, 3G, 4G, or long term evolution (LTE) network. The second communication processor 520b may establish a communication channel which corresponds to a designated band (e.g., approximately 6 GHz to 60 GHz) among bands to be used for wireless communication with a second communication network, and may support 5G network communication via the established communication channel. According to an embodiment, the second communication network may be 5G network defined in 3GPP. According to an embodiment, the first communication processor 520a or the second communication processor 520b may establish a communication channel which corresponds to another designated band (e.g., approximately 6 GHz or less) among the bands to be used for the wireless communication with the second communication network, and/or may support 5G network communication via the established communication channel.

The first communication processor 520a may transmit and receive data to and from the second communication processor 520b. For example, the first communication processor 520a may transmit and receive data to and from the second communication processor 520b via a UART or a PCIe interface. According to an embodiment, the first communication processor 520a may transmit and receive, to and from the second communication processor 520b, at least one of activated band information, channel allocation information, information about a communication state (idle, sleep, active) with a network, sensing information, information about output strength, or resource block (RB) allocation information.

According to an embodiment, the first communication processor 520a may not be directly connected to the second communication processor 520b. In this case, the first communication processor 520a may transmit and receive data to and from the second communication processor 520b via the processor 510 (e.g., an application processor).

According to an embodiment, the first communication processor 520a and the second communication processor 520b may be implemented in a single chip or a single package. According to an embodiment, the first communication processor 520a or the second communication processor 520b may be formed in a single chip or a single package, together with a processor 120, an auxiliary processor 123, or a communication module 190. For example, as illustrated in FIG. 2B, an integrated communication processor 260 may support all of a function for a communication with the first communication network and a function for a communication with the second communication network.

According to an embodiment, the first transceiver 530a and/or the second transceiver 530b may receive a frequency signal from a temperature-compensated crystal oscillator (TCXO) and may output a first signal (TX1 or a first UL) and a second signal (TX2 or a second UL), respectively. The first transceiver 530a may mix a PLL_1 (phase locked loop_1) signal and a signal transmitted from the first communication processor 520a using a mixer, and may output a radio frequency (RF) signal which is appropriate for the frequency of the first communication network. The second transceiver 530b may mix a PLL_2 signal and a signal transmitted from the second communication processor 520b using a mixer, and may output an RF signal which is appropriate for the frequency of the second communication network. According to an embodiment, the first signal may refer to a signal on a transmission path which is outputted from the first transceiver 530a and is transmitted via the first antenna 570a. The second signal may refer to a signal on a transmission path which is outputted from the second transceiver 530b and is transmitted via the second antenna 570b.

According to an embodiment, the first power amplifier 540a may include an amplifier which is connected to the first transceiver 530a, amplifies the RF signal, decreases distortion of the output signal, or maintains high-efficiency characteristic. The second power amplifier 540b may include an amplifier which is connected to the second transceiver 530b, amplifies the RF signal, decreases distortion of the output signal, or maintains high-efficiency characteristic.

According to an embodiment, the first duplexer 550a may receive a first signal from the first power amplifier 540a and may transmit the first signal to the first antenna 570a, and may receive a downlink signal received via the first antenna 570a and may transmit the downlink signal to the first transceiver 530a. The second duplexer 550b may receive a second signal from the second power amplifier 540b and may transmit the second signal to the second antenna 570b, and may receive a downlink signal received via the second antenna 570b and may transmit the downlink signal to the second transceiver 530b.

According to an embodiment, the first power amplifier 540a may amplify the first signal (TX1) received from the first transceiver 530a based on a gain designated under the control of the first communication processor 520a, and may transmit the amplified first signal to the first antenna 570a via the first coupler 560a. The second power amplifier 540b may amplify the second signal (TX2) received from the second transceiver 530b based on a gain designated under the control of the second communication processor 520b, and may transmit the amplified second signal to the second antenna 570b via the second coupler 560b.

According to an embodiment, at least a part of the first signal transmitted via the first coupler 560a may be fed back and provided to the first transceiver 530a. At least a part of the second signal transmitted via the second coupler 560b may be fed back and provided to the second transceiver 530b.

According to an embodiment, the first transceiver 530a and/or the second transceiver 530b may receive a transmission feedback signal which is fed back from the first coupler 560a and/or second coupler 560b, and may change its frequency using an internal local oscillator (LO) to process the transmission feedback signal to be a baseband signal. According to an embodiment, the first transceiver 530a and the second transceiver 530b may amplify the baseband signal or convert the baseband signal into a digital signal by using an analog to digital converter (ADC), and may transmit the same to the first communication processor 520a or the second communication processor 520b. The couplers 560a and 560b may feed back at least a portion of signals amplified by the power amplifiers 540a and 540b connected thereto, such that relatively small signal compared to the amplified signal can be fed back to the first transceiver 530a and the second transceiver 530b, so that the first transceiver 530a and the second transceiver 530b may process the signals fed back from the couplers 560a and 560b.

According to an embodiment, the first communication processor 520a may control the gain of the first signal transmitted via the first transceiver 530a, and may control the bias of the first power amplifier 540a, based on a control signal. The second communication processor 520b may control the gain of the second signal transmitted via the second transceiver 530b, and may control the bias of the second power amplifier 540b, based on a control signal.

According to an embodiment, in an electronic device which provides dual connectivity illustrated in FIG. 5A, the transceivers 530a and 530b may amplify sensing signals inputted via feedback receiver (FBRX) ports (FBRX1 and FBRX2) to transmit the amplified sensing signals to the communication processors 520a and 520b connected thereto. According to an embodiment, in the electronic device that provides dual connectivity illustrated in FIG. 5A, the transceivers 530a and 530b may convert sensing signals inputted via the FBRX ports (FBRX1 and FBRX2) into baseband signals, may enable the baseband signals to go through an analog/digital converter (ADC), and may transmit digitalized sensing signals to the communication processors 520a and 520b connected thereto. The communication processors 520a and 520b may identify whether the first signal or the second signal is abnormal based on sensing information transferred via the transceivers 530a and 530b.

Figure 5B:
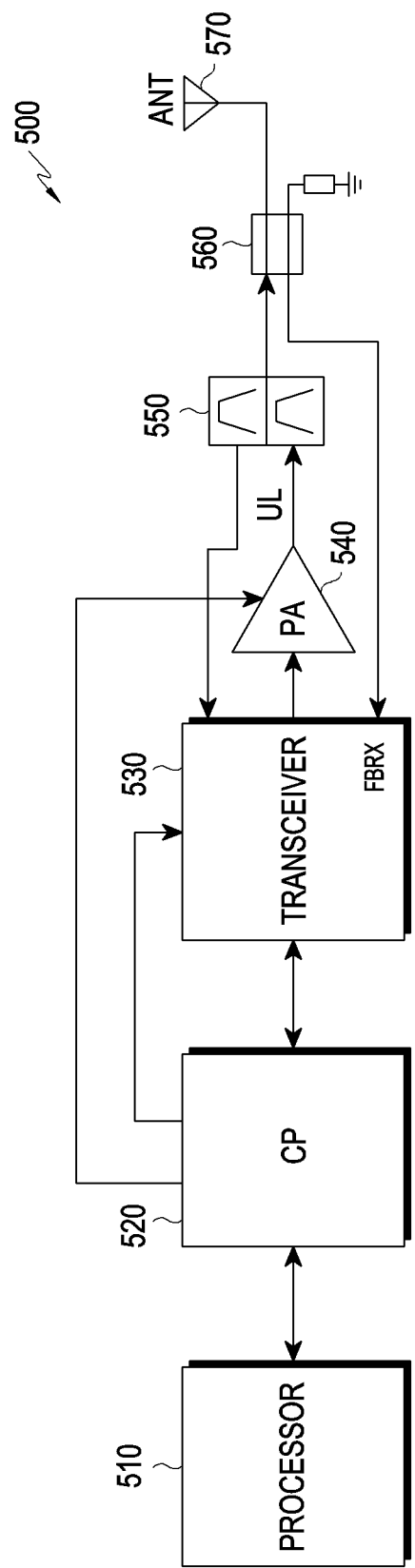
FIG. 5B is a block diagram illustrating an electronic device according to an embodiment.

FIG. 5B is a block diagram illustrating an electronic device providing dual connectivity according to an embodiment. Referring to FIG. 5B, an electronic device 500 according to an embodiment may include a processor 510 (e.g., an application processor), a communication processor 520 (e.g., a communication processor (CP)), a transceiver 530, a power amplifier 540, a duplexer 550, a coupler 560, or an antenna 570. The electronic device 500 in FIG. 5B may be similar to, or the same as, the electronic device 101 in FIG. 1, FIG. 2A, or FIG. 2B. The function of each component in the electronic device 500 in FIG. 5B according to an embodiment may be similar to, or the same as, the function of each corresponding component in FIG. 5A, so a detailed description for the same function will be omitted. For example, the processor 510 in FIG. 5B may correspond to a processor 510 in FIG. 5A. The communication processor 520 in FIG. 5B may correspond to a first CP 520a or a second CP 520b in FIG. 5A. The transceiver 530 in FIG. 5B may correspond to a first transceiver 530a or a second transceiver 530b in FIG. 5A. The power amplifier 540 in FIG. 5B may correspond to a first power amplifier 540a or a second power amplifier 540b in FIG. 5A. The coupler 560 in FIG. 5B may correspond to a first coupler 560a or a second coupler 560b in FIG. 5A. The antenna 570 in FIG. 5B may correspond to a first antenna 570a or a second antenna 570b in FIG. 5A.

According to an embodiment, at least a part of the first signal transmitted via the coupler 560 may be fed back and provided to the transceiver 530. According to an embodiment, the transceiver 530 may receive a transmission feedback signal which is fed back from the coupler 560, and may change its frequency using an internal local oscillator (LO) to process the transmission feedback signal to be a baseband signal. According to an embodiment, the transceiver 530 may amplify the baseband signal or convert the baseband signal into a digital signal by using an analog to digital converter (ADC), and may transmit the same to the communication processor 520. The coupler 560 may feed back at least a portion of a signal amplified by the power amplifier 540 connected thereto, such that relatively small signal compared to the amplified signal can be fed back to the transceiver 530, so that the transceiver may process the signal fed back from the coupler 560.

According to an embodiment, the communication processor 520 may control the gain of the first signal transmitted via the transceiver 530, and may control the bias of the power amplifier 540, based on a control signal. According to an embodiment, in an electronic device illustrated in FIG. 5B, the transceiver 530 may amplify a sensing signal inputted via a feedback receiver (FBRX) port (FBRX) and transmit the amplified sensing signal to the communication processor 520. According to an embodiment, in the electronic device illustrated in FIG. 5B, the transceiver 530 may convert a sensing signal inputted via the FBRX port (FBRX) into a baseband signal, may enable the baseband signal to go through an analog/digital converter (ADC), and may transmit the digitalized sensing signal to the communication processor 520. The communication processor 520 may identify whether the first signal is abnormal based on sensing information transferred via the transceiver 530.

Figure 5C:
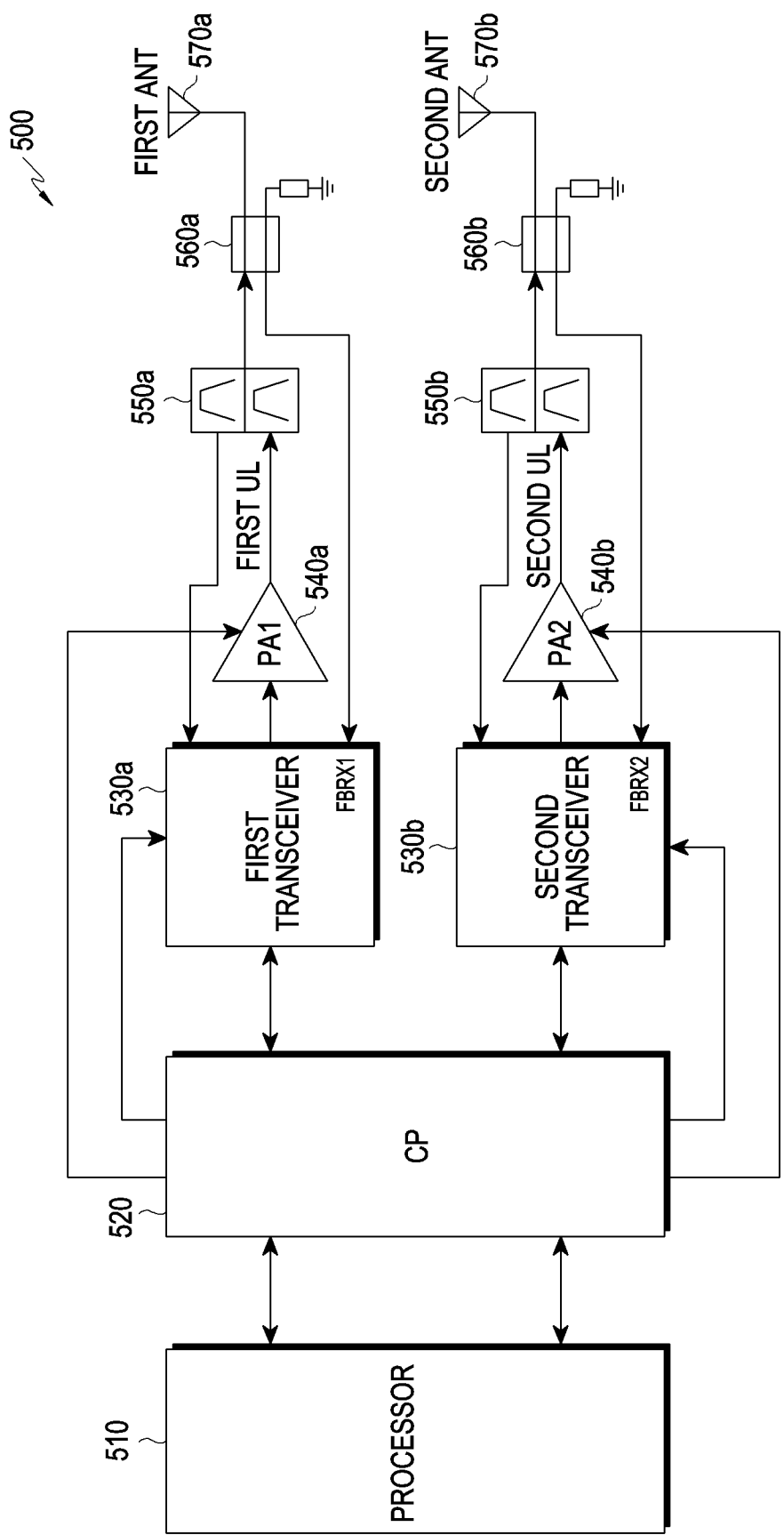
FIG. 5C is a block diagram illustrating an electronic device providing dual connectivity according to an embodiment.

FIG. 5C is a block diagram illustrating an electronic device providing dual connectivity according to an embodiment. Referring to FIG. 5C, an electronic device 500 according to an embodiment may include a processor 510 (e.g., an application processor), a communication processor 520

(e.g., a communication processor (CP)), a first transceiver 530a, a second transceiver 530b, a first power amplifier 540a, a second power amplifier 540b, a first duplexer 550a, a second duplexer 550b, a first coupler 560a, a second coupler 560b, a first antenna 570a, or a second antenna 570b. The electronic device 500 in FIG. 5C may be similar to, or the same as, the electronic device 101 in FIG. 1, FIG. 2A, or FIG. 2B. The function of each component in the electronic device 500 in FIG. 5C according to an embodiment may be similar to, or the same as, the function of each corresponding component in FIG. 5A, so a detailed description for the same function will be omitted. For example, the processor 510 in FIG. 5C may correspond to the processor 510 in FIG. 5A. The communication processor 520 in FIG. 5C may correspond to the first CP 520a or a second CP 520b in FIG. 5A.

According to an embodiment, at least a part of the first signal transmitted via the first coupler 560a may be fed back and provided to the first transceiver 530a. At least a part of the second signal transmitted via the second coupler 560b may be fed back and provided to the second transceiver 530b.

According to an embodiment, the first transceiver 530a and/or the second transceiver 530b may receive a transmission feedback signal which is fed back from the first coupler 560a and/or the second coupler 560b, and may change its frequency using an internal local oscillator (LO) to process the transmission feedback signal to be a baseband signal. According to an embodiment, the first transceiver 530a and the second transceiver 530b may amplify the baseband signal or convert the baseband signal into a digital signal by using an analog to digital converter (ADC), and may transmit the same to the communication processor 520. The couplers 560a and 560b may feed back at least a portion of signals amplified by the power amplifiers 540a and 540b connected thereto, such that relatively small signal compared to the amplified signal can be fed back to the first transceiver 530a and the second transceiver 530b, so that the first transceiver 530a and the second transceiver 530b may process the signals fed back from the couplers 560a and 560b.

According to an embodiment, the communication processor 520 may control the gain of the first signal or the second signal transmitted via the first transceiver 530a or the second transceiver 530b, and may control the bias of the first power amplifier 540a or the second power amplifier 540b, based on a control signal. According to an embodiment, in the electronic device which provides dual connectivity illustrated in FIG. 5C, the transceivers 530a and 530b may amplify sensing signals inputted via feedback receiver (FBRX) ports (FBRX1 and FBRX2) to transmit the amplified sensing signals to the communication processor 520. According to an embodiment, in the electronic device which provides the dual connectivity illustrated in FIG. 5B, the transceivers 530a and 530b may convert sensing signals inputted via the FBRX ports (FBRX1 and FBRX2) into baseband signals, may enable the baseband signals to go via an analog/digital converter (ADC), and may transmit digitalized sensing signals to the communication processor 520. The communication processor 520 may identify whether the first signal or the second signal is abnormal based on sensing information transferred via the transceivers 530a and 530b.

Figure 6:
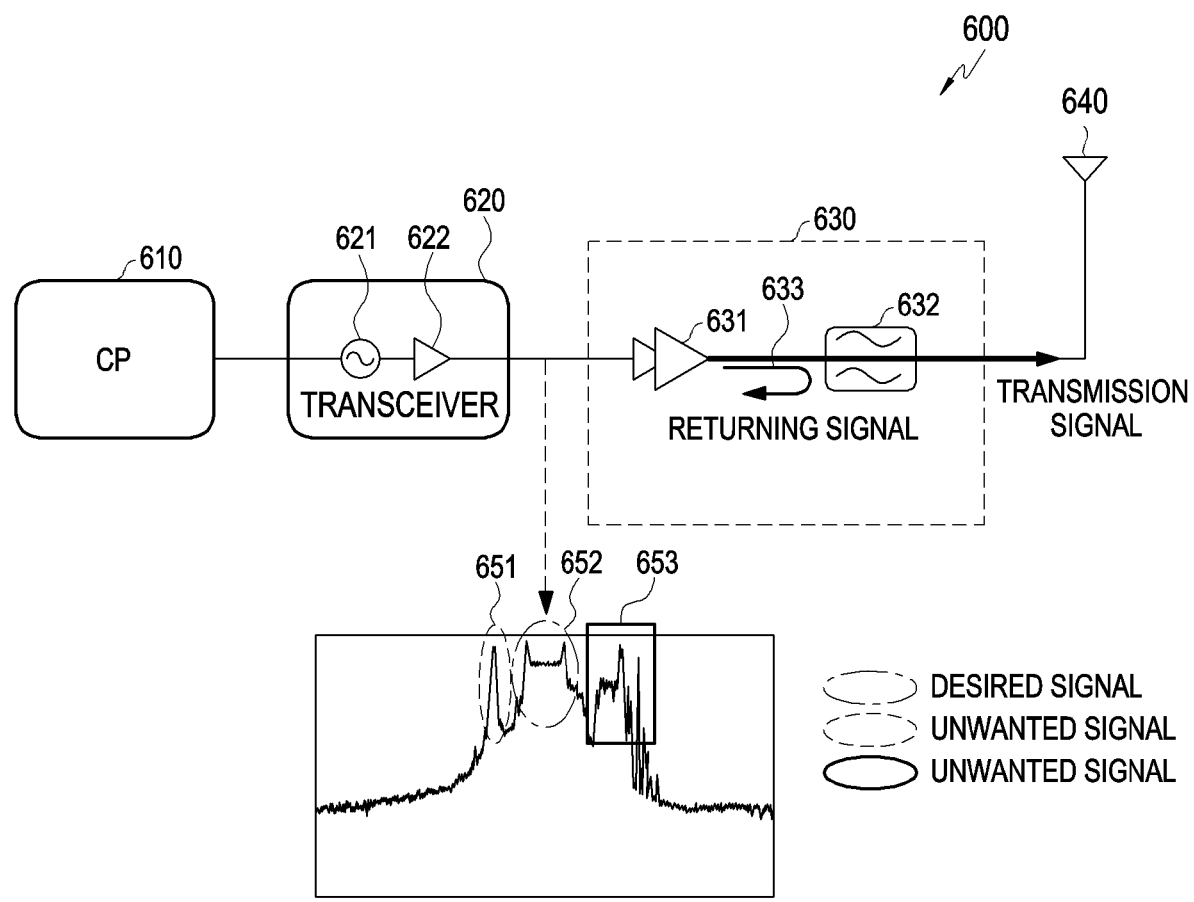
FIG. 6 is a diagram illustrating an example where a reflected wave has occurred according to an embodiment.

FIG. 6 is a diagram illustrating an example where a reflected wave has occurred according to an embodiment. Referring to FIG. 6, according to an embodiment, an electronic device 600 (e.g., an electronic device 101 in FIG. 1, FIG. 2A, or FIG. 2B, and an electronic device 500 in FIG. 5) may include a communication processor (CP) 610, a transceiver 620, a front end module (FEM) 630, and an antenna 640. The transceiver 620 may include a mixer 621 and an amplifier 622. The FEM 630 may include a power amplifier module (PAM) 631 and a band pass filter (BPF) 632.

According to an embodiment, the CP 610 may generate a signal to be transmitted and transmit the signal to the transceiver 620, and the transceiver 620 may convert the signal received from the CP 610 into a signal in a frequency band to be transmitted via the mixer 621. The frequency-converted signal via the mixer 621 may be amplified via the amplifier 622 and then transmitted to the FEM 630. The PAM 631 of the FEM 630 may amplify the signal to be transmitted to the appropriate power level to output a first signal. The first signal which is outputted after being amplified to a predetermined power level (e.g., 20 dBm) via the PAM 631 may be filtered in the BPF 632 to transmit only the signal 652 in the desired frequency band. The first signal filtered via the BPF 632 may be wirelessly transmitted via the antenna 640.

According to an embodiment, if an abnormal operation occurs in the CP 610 or the transceiver 620, as shown in FIG. 6, signals 651 and 653 in another frequency band other than the signal 652 in the desired frequency band may be inputted to the FEM 630.

The PAM 631 of the FEM 630 may amplify not only the signal 652 in the desired frequency band but also the signals 651 and 653 in the other undesired frequency band. In the BPF 632, the signals 651 and 653 in the undesired frequency band may be filtered, and the filtered signals may inputted to the PAM 631 again as reflected wave signals (returning signals) and may cause damage to the PAM 631.

Figure 7:
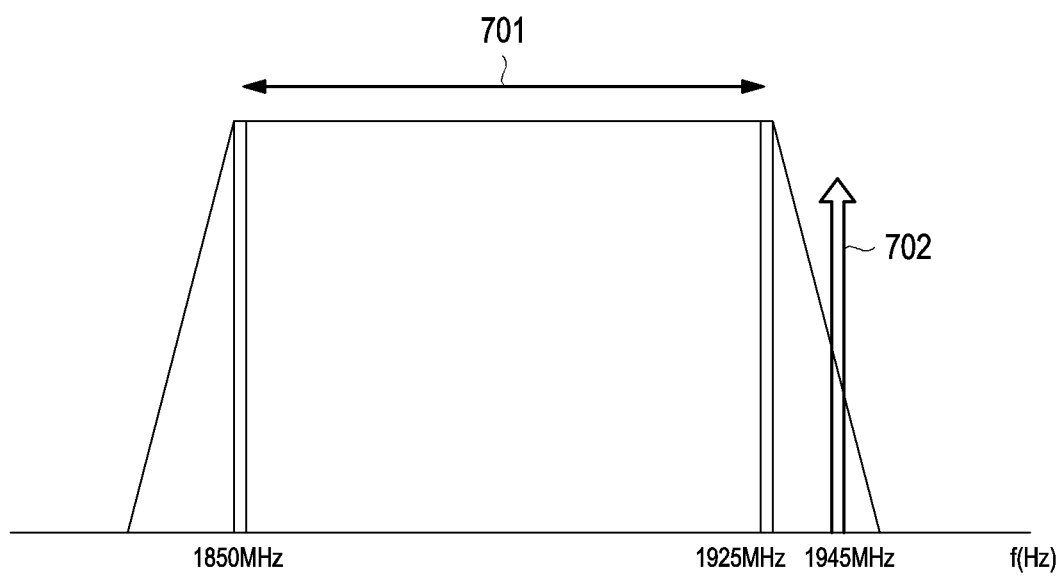
FIG. 7 is a graph illustrating a pass band of a band pass filter according to an embodiment.

FIG. 7 is a graph illustrating a pass band of a band pass filter according to an embodiment. Referring to FIG. 7, according to an embodiment, if the electronic device 600 intends to transmit a signal in an LTE band, a transmission frequency band 701 of the first signal which is to be transmitted via the antenna 640 in FIG. 6 may be about 1850 MHz to 1925 MHz. According to an embodiment, a received signal 702 in the LTE band may be at 1945 MHz. Accordingly, a BPF 632 may filter signals at the edge of the pass band so that signals in the band of 1945 MHz may be filtered to prevent interference between the received signal 702 and a transmitted signal. Signals which fail to pass through the BPF 632 due to the filtering in the BPF 632 may formed a reflected wave and inputted to the PAM 631. According to an embodiment, in a case that an error occurs in the CP 610 or the transceiver 620 and a signal in the transmission frequency band 701 of the first signal is not normally generated, a reflected wave may occur when filtering is performed by the BPF 632 may cause damage to the PAM 631.

Figure 8A:
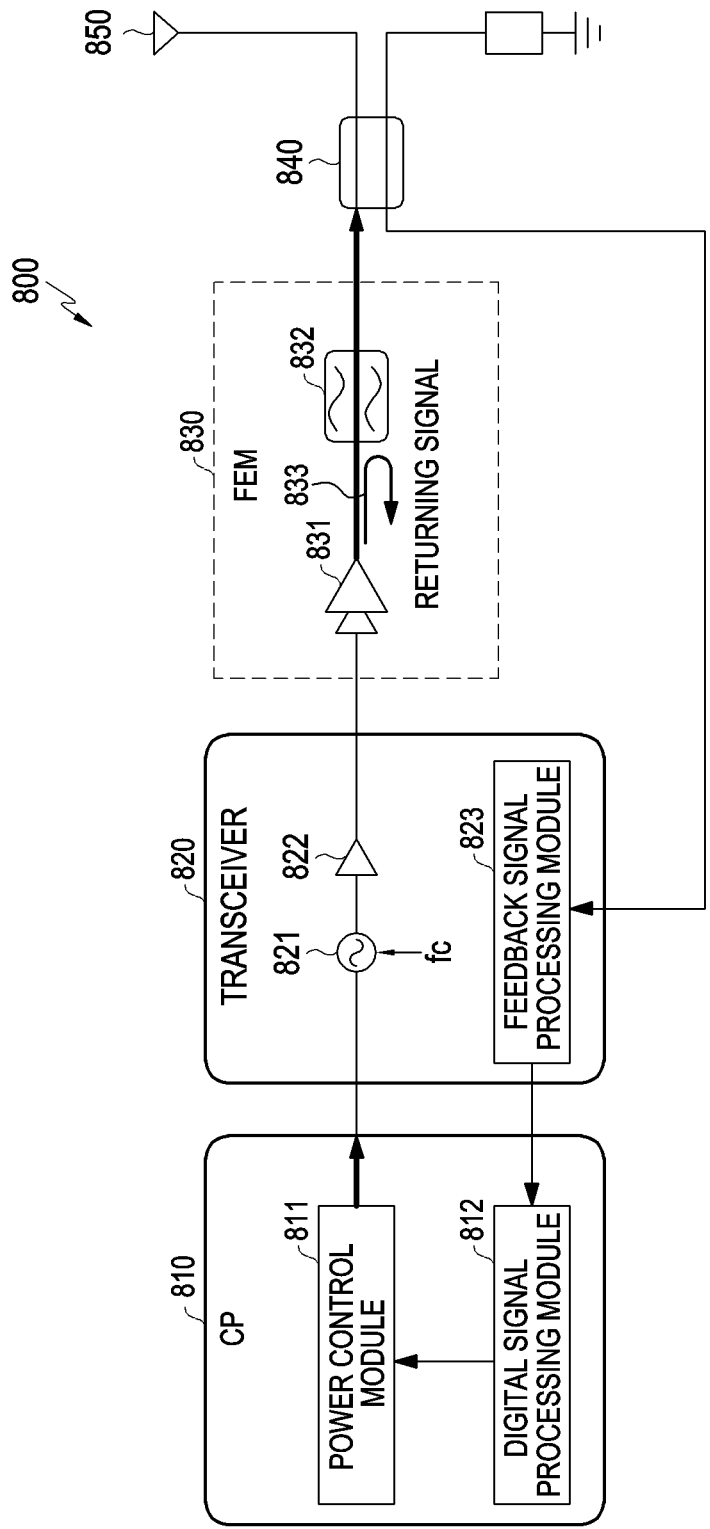
FIG. 8A is a block diagram illustrating an electronic device according to an embodiment.

FIG. 8A is a block diagram illustrating an electronic device according to an embodiment. Referring to FIG. 8A, according to an embodiment, an electronic device 800 (e.g., an electronic device 101 in FIG. 1, FIG. 2A, or FIG. 2B, and an electronic device 500 in FIG. 5) may include a communication processor (CP) 810, a transceiver 820, a front end module (FEM) 830, a coupler 840, and an antenna 850. The CP 810 may include a power control module 811 and a digital signal processing module 812. The transceiver 820 may include a mixer 821, an amplifier 822, and a feedback signal processing module 823. The FEM 830 may include a power amplifier module (PAM) 831 and a band pass filter (BPF) 832.

According to an embodiment, the CP 810 may generate a signal to be transmitted and transmit the signal to the transceiver 820, and the transceiver 820 may convert the signal received from the CP 810 into a signal in a frequency band to be transmitted via the mixer 821. The frequency-converted signal via the mixer 821 may be amplified via the amplifier 822 and then transmitted to the FEM 830. The PAM 831 of the FEM 830 may amplify the signal to be transmitted to an appropriate set power level to output a first signal. The first signal which is outputted after being amplified to a predetermined power level (e.g., 20 dBm) via the PAM 831 may be filtered in the BPF 832 to transmit only the portion of the first signal in the desired frequency band. The first signal filtered via the BPF 832 may go through the coupler 840 and be wirelessly transmitted via the antenna 850.

According to an embodiment, if a problem occurs in the CP 810 or the transceiver 820, as described in FIG. 6 and FIG. 7, signals 651 and 653 in another frequency band other than the signal 652 in the desired frequency band may be inputted to the FEM 830.

The PAM 831 of the FEM 830 may amplify not only the signal 652 in the desired frequency band but also the signals 651 and 653 in the other undesired frequency band. In the BPF 832, the signals 651 and 653 in the undesired frequency band may be filtered, and the filtered signals may inputted to the PAM 831 again as reflected wave signals (returning signals) and may cause damage to the PAM 831.

According to an embodiment, the electronic device 800 (e.g., the CP 810 or the transceiver 820) may identify whether the transmission signal (the first signal) is abnormal based on a signal fed back via the coupler 840. If it is identified that the transmitted signal is abnormal, the electronic device 800 may adjust transmission power of the transmission signal (for example, decrease the transmission power, or stop transmission) during a set time interval, or control a setting of the transceiver 820 (for example, control a setting of a memory included in the transceiver 820, or change a carrier frequency ($f_c$) of the transmission signal). According to an embodiment, if most of the signal inputted to the BPF 832 is filtered, and the feedback signal inputted to the transceiver 820 does not reach a reference value, the electronic device 800 may identify that a signal in the unwanted frequency band is outputted, and accordingly, may identify that the transmission signal is abnormal.

According to an embodiment, if the transceiver 820 receives a feedback signal from the coupler 840 and identifies that the transmission signal is abnormal based on the feedback signal, the transceiver 820 may control to initialize or reset a setting of the memory included in the transceiver 820 or may control to change a carrier frequency ($f_c$) of the transmission signal.

According to an embodiment, the electronic device 800 may transmit a signal fed back via the coupler 840 to the transceiver 820. According to an embodiment, the signal fed back via the coupler 840 may be inputted to a feedback port (FBRX) or a power determination port (PDET) of the transceiver 820.

According to an embodiment, the fed back signal may be relatively small compared to the signal that has passed through the coupler 840 and is transmitted to the antenna 850, so the feedback signal processing module 823 of the transceiver 820 may receive and amplify the signal fed back from the coupler 840. The transceiver 820 may transmit the signal amplified via the feedback signal processing module 823 to the CP 810.

According to an embodiment, the digital signal processing module 812 of the CP 810 may digital signal-process the signal received from the transceiver 820 and transmit the digital signal-processed signal to the power control module 811. If the digital signal-processed signal received from the digital signal processing module 812 satisfies a set condition, the power control module 811 may identify that the first signal to be transmitted is abnormal.

According to an embodiment, the digital signal processing module 812 may digital signal-process a signal received from the transceiver 820, convert the digital signal-processed signal into a set parameter value, and transmit the converted parameter value to the power control module 811. According to an embodiment, if the parameter value received from the digital signal processing module 812 satisfies a set condition, the power control module 811 may identify that the first signal is abnormal.

According to an embodiment, the parameter value converted from the signal received from the CP 810 may include a parameter 'h_db' related to a hardware block, a parameter 'f_db' related to a firmware block, and '1s_error' indicating a least square error, but is not limited thereto.

Table 1 and Table 2 below show actual measured values of 'h_db' and '1s_error'. According to an embodiment, Table 1 shows measured values in an abnormal operation situation, and Table 2 shows measured values in a normal situation.

TABLE 1

| Log Time Time | Delta compared to Tx Power Target h_db | Error Index 1s error |
| --- | --- | --- |
| 48:50.6 | 56 | 32768 |
| 48:55.9 | 52 | 32768 |
| 48:59.8 | 56 | 32768 |
| 49:32.2 | 56 | 32768 |
| 50:42.7 | 52 | 32768 |
| 51:05.9 | 52 | 32768 |
| 51:14.9 | 52 | 32768 |
| 51:14.9 | 57 | 32768 |
| 51:58.4 | 57 | 32768 |

TABLE 2

| Log Time time | Delta compared to Tx Power Target h_db | Error Index 1s error |
| --- | --- | --- |
| 20:07.5 | 3 | 66 |
| 20:07.5 | 2 | 53 |
| 20:07.6 | 3 | 67 |
| 20:07.6 | 2 | 54 |
| 20:07.7 | 3 | 66 |
| 20:07.8 | 3 | 67 |
| 20:07.9 | 3 | 66 |
| 20:08.1 | 2 | 52 |
| 20:08.2 | 2 | 52 |
| 20:08.3 | 2 | 53 |
| 20:08.3 | 3 | 65 |

Referring to Table 1 and Table 2, the 'h_db' value in the normal state is 2 or 3, which is a relatively small value, while the 'h_db' value in the abnormal state is a value from among 52 to 57, which is a relatively large value. In addition, the '1s_error' value in the normal state is a relatively small value from among 52 to 67, while the '1s_error' value in the abnormal state is 32768, which is a default value (e.g., a garbage value) set to indicate an error state. According to an embodiment, the error indicator (e.g., h_db or error) may mean a gap state of a signal detected by feedback compared to an output signal, and the larger the error indicator is, the larger the difference between the signal generated in the transceiver 820 and the signal outputted to the antenna 850.

According to an embodiment, if the 'h_db' value or the '1s_error' value is greater than a set reference value or satisfies a set value or a set criterion which corresponds to the abnormal state, the power control module 811 may identify that the first signal is abnormal.

According to an embodiment, if the first signal is identified to be abnormal based on the signal or the parameter value received from the digital signal processing module 812, the power control module 811 may adjust transmission power of the first signal during a set time interval. According to an embodiment, if the first signal is identified to be abnormal, the power control module 811 may control to decrease the transmission power of the first signal during a first time interval. According to an embodiment, if the first signal is identified to be abnormal, the power control module 811 may control to stop transmission of the first signal during a second time interval. According to an embodiment, if the first signal is identified to be restored again to the normal state after detection of an abnormal signal, the power control module 811 may control to output normally the transmission power of the first signal. According to an embodiment, if the 'h_db' value or the '1s_error' value is less than or equal to the set reference value, or the 'h_db' value or the '1s_error' value is changed from a value in Table 1 to a value in Table 2, the electronic device (e.g., the processor 860, the CP 810, or the transceiver 820) may identify that the first signal is restored to the normal state.

According to an embodiment, if the first signal is identified to be abnormal based on the signal or the parameter value received from the digital signal processing module 812, the power control module 811 may transmit a control signal related to a setting of a memory included in the transceiver 820 to the transceiver 820. According to an embodiment, the control signal related to the setting of the memory may include a control signal for checking a registry setting of the memory included in the transceiver 820. According to an embodiment, the control signal related to the setting of the memory may include a control signal for instructing to reset the registry of the memory included in the transceiver 820.

According to an embodiment, the transceiver 820 may receive a control signal from the CP 810 to control power of a transmission signal or perform an operation related to a setting of a memory. According to an embodiment, the transceiver 820 may receive the control signal from the CP 810 and identify whether a register setting of the memory is normal. According to an embodiment, the transceiver 820 may receive the control signal from the CP 810 and perform a memory self check operation to reprogram the memory. According to an embodiment, according to the memory self-check operation, the transceiver 820 may perform a memory refresh of the transceiver 820 or may check a currently configured value via RFIC reprogramming which is performed when a resource block (RB) is changed. The memory check may eliminate the reason for the frequency signals causing the abnormal operation.

Figure 8B:
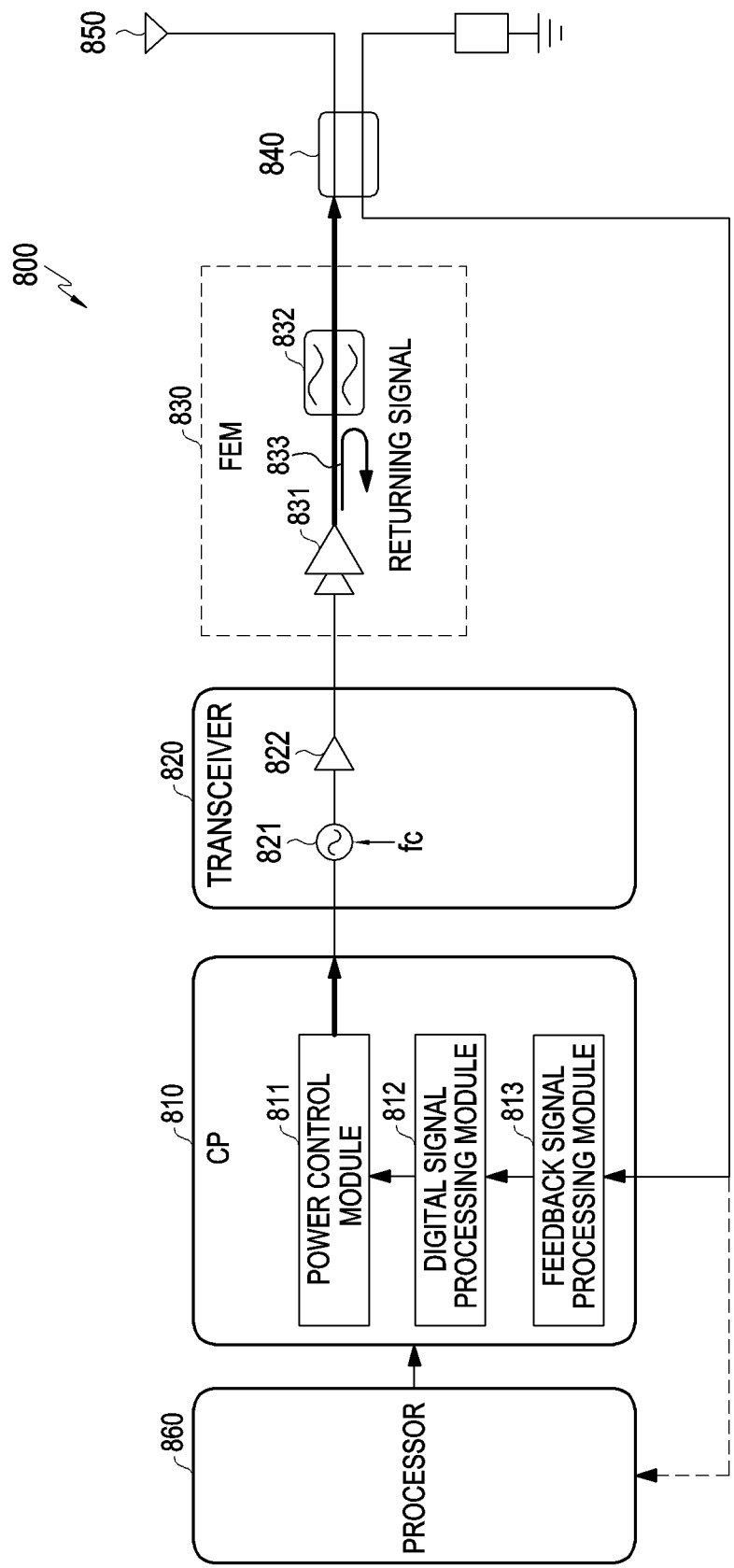
FIG. 8B is a block diagram illustrating an electronic device according to an embodiment.

FIG. 8B is a block diagram illustrating an electronic device according to an embodiment. Referring to FIG. 8B, according to an embodiment, an electronic device 800 (e.g., an electronic device 101 in FIG. 1, FIG. 2A, or FIG. 2B, and an electronic device 500 in FIG. 5) may include a processor 860 (e.g., a processor 120 in FIG. 1, FIG. 2A, or FIG. 2B), a communication processor (CP) 810, a transceiver 820, a front end module (FEM) 830, a coupler 840, and an antenna 850. The CP 810 may include a power control module 811, a digital signal processing module 812, and a feedback signal processing module 813. The transceiver 820 may include a mixer 821 and an amplifier 822. The FEM 830 may include a power amplifier module (PAM) 831 and a band pass filter (BPF) 832.

According to an embodiment, the CP 810 may generate a signal to be transmitted and transmit the signal to the transceiver 820, and the transceiver 820 may convert the signal received from the CP 810 into a signal in a frequency band to be transmitted via the mixer 821. The frequency-converted signal via the mixer 821 may be amplified via the amplifier 822 and then transmitted to the FEM 830. The PAM 831 of the FEM 830 may amplify the signal to be transmitted to an appropriate set power level to output a first signal. The first signal which is outputted after being amplified to a predetermined power level (e.g., 20 dBm) via the PAM 831 may be filtered in the BPF 832 to transmit only the portion of the first signal in the desired frequency band. The first signal filtered via the BPF 832 may go through the coupler 840 and be wirelessly transmitted via the antenna 850.

According to an embodiment, if a problem occurs in the CP 810 or the transceiver 820, as described in FIG. 6 and FIG. 7, signals 651 and 653 in another frequency band other than the signal 652 in the desired frequency band may be inputted to the FEM 830.

The PAM 831 of the FEM 830 may amplify not only the signal 652 in the desired frequency band but also the signals 651 and 653 in the other undesired frequency band. In the BPF 832, the signals 651 and 653 in the undesired frequency band may be filtered, and the filtered signals may inputted to the PAM 831 again as reflected wave signals (returning signals) and may cause damage to the PAM 831.

According to an embodiment, the electronic device 800 (e.g., the processor 860, the CP 810 or the transceiver 820) may identify whether the transmission signal (the first signal) is abnormal based on a signal fed back via the coupler 840. If it is identified that the transmitted signal is abnormal, the electronic device 800 may adjust transmission power of the transmission signal (for example, decrease the transmission power, or stop transmission) during a set time interval, or control a setting of the transceiver 820 (for example, control a setting of a memory included in the transceiver 820, or change a carrier frequency ($f_c$) of the transmission signal). According to an embodiment, if most of the signal inputted to the BPF 832 is filtered, and the feedback signal inputted to the transceiver 820 does not reach a reference value, the electronic device 800 may identify that a signal in the unwanted frequency band is outputted, and accordingly, may identify that the transmission signal is abnormal.

According to an embodiment, if the processor 860 or the CP 810 receives a feedback signal from the coupler 840 and identifies that a transmission signal is abnormal based on the feedback signal, the processor 860 or the CP 810 may control to initialize or reset a setting of the memory included in the transceiver 820 or may control to change a carrier frequency ($f_c$) of the transmission signal. Hereinafter, an example in which a feedback signal is received and processed by the CP 810 is described, but the feedback signal may be received and processed by the processor 860 according to another embodiment. If the feedback signal is received and processed by the processor 860, the processor 860 may include at least one of the power control module 811, the digital signal processing module 812, and the feedback signal processing module 813 that in another embodiment is included in the CP 810.

According to an embodiment, the electronic device 800 may transmit a signal fed back via the coupler 840 to the CP 810. According to an embodiment, the signal fed back via the coupler 840 may be inputted to a feedback port (FBRX) or a power determination port (PDET) of the CP 810.

According to an embodiment, the fed back signal may be relatively small compared to the signal that has passed through the coupler 840 and is transmitted to the antenna 850, so the feedback signal processing module 813 of the CP 810 may receive and amplify the signal fed back from the coupler 840. The signal amplified via the feedback signal processing module 813 may be transmitted to the digital signal processing module 812.

According to an embodiment, the digital signal processing module 812 of the CP 810 may digital signal-process the signal received from the feedback signal processing module 813 and transmit the digital signal-processed signal to the power control module 811. If the digital signal-processed signal received from the digital signal processing module 812 satisfies a set condition, the power control module 811 may identify that the first signal to be transmitted is abnormal.

According to an embodiment, the digital signal processing module 812 may digital signal-process a signal received from the transceiver 820, convert the digital signal-processed signal into a set parameter value, and transmit the converted parameter value to the power control module 811. According to an embodiment, if the parameter value received from the digital signal processing module 812 satisfies a set condition, the power control module 811 may identify that the first signal is abnormal.

According to an embodiment, if the first signal is identified to be abnormal based on the signal or the parameter value received from the digital signal processing module 812, the power control module 811 may adjust transmission the power of the first signal during a set time interval. According to an embodiment, if the first signal is identified to be abnormal, the power control module 811 may control to decrease the transmission power of the first signal during a first time interval. According to an embodiment, if the first signal is identified to be abnormal, the power control module 811 may control to stop transmission of the first signal during a second time interval. According to an embodiment, if the first signal is identified to be restored again to the normal state after detection of an abnormal signal, the power control module 811 may control to output normally the transmission power of the first signal.

According to an embodiment, if the first signal is identified to be abnormal based on the signal or the parameter value received from the digital signal processing module 812, the power control module 811 may transmit a control signal related to a setting of a memory included in the transceiver 820 to the transceiver 820. According to an embodiment, the control signal related to the setting of the memory may include a control signal for checking a registry setting of the memory included in the transceiver 820. According to an embodiment, the control signal related to the setting of the memory may include a control signal for instructing to reset the registry of the memory included in the transceiver 820.

According to an embodiment, the transceiver 820 may receive a control signal from the CP 810 to control power of a transmission signal or perform an operation related to a setting of a memory. According to an embodiment, the transceiver 820 may receive the control signal from the CP 810 and identify whether a register setting of the memory is normal. According to an embodiment, the transceiver 820 may receive the control signal from the CP 810 and perform a memory self check operation to reprogram the memory. According to an embodiment, according to the memory self-check operation, the transceiver 820 may perform a memory refresh of the transceiver 820 or may check a currently configured value via RFIC reprogramming which is performed when a resource block (RB) is changed. The memory check may eliminate the reason for the frequency signals causing the abnormal operation.

Figure 8C:
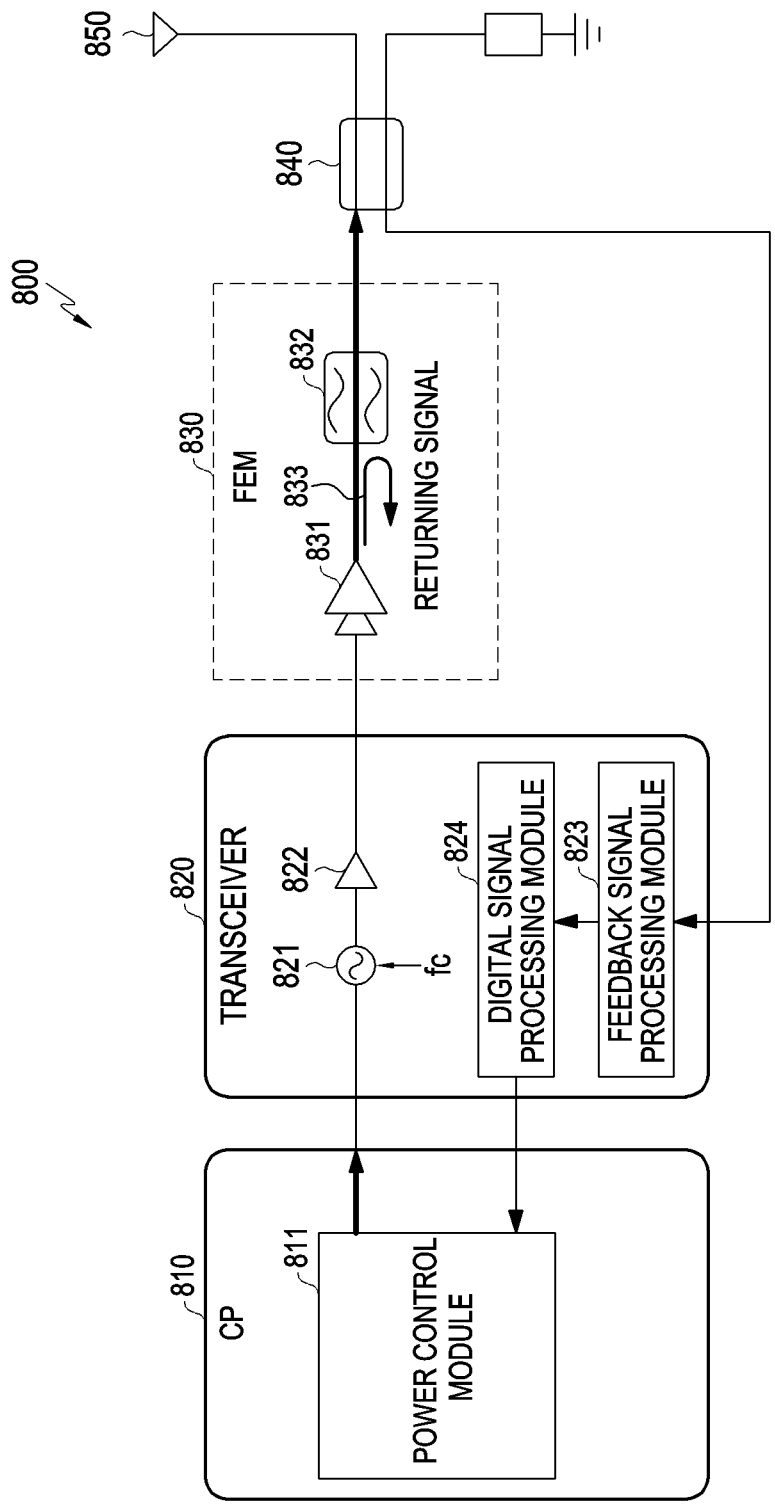
FIG. 8C is a block diagram illustrating an electronic device according to an embodiment.

FIG. 8C is a block diagram illustrating an electronic device according to an embodiment. Referring to FIG. 8C, according to an embodiment, an electronic device 800 (e.g., an electronic device 101 in FIG. 1, FIG. 2A, or FIG. 2B, and an electronic device 500 in FIG. 5) may include a communication processor (CP) 810, a transceiver 820, a front end module (FEM) 830, a coupler 840, and an antenna 850. The CP 810 may include a power control module 811. The transceiver 820 may include a mixer 821, an amplifier 822, a digital signal processing module 824, and a feedback signal processing module 823. The FEM 830 may include a power amplifier module (PAM) 831 and a band pass filter (BPF) 832.

According to an embodiment, the CP 810 may generate a signal to be transmitted and transmit the signal to the transceiver 820, and the transceiver 820 may convert the signal received from the CP 810 into a signal in a frequency band to be transmitted via the mixer 821. The frequency-converted signal via the mixer 821 may be amplified via the amplifier 822 and then transmitted to the FEM 830. The PAM 831 of the FEM 830 may amplify the signal to be transmitted to an appropriate set power level to output a first signal. The first signal which is outputted after being amplified to a predetermined power level (e.g., 20 dBm) via the PAM 831 may be filtered in the BPF 832 to transmit only the portion of the first signal in the desired frequency band. The first signal filtered via the BPF 832 may go through the coupler 840 and be wirelessly transmitted via the antenna 850.

According to an embodiment, if a problem occurs in the CP 810 or the transceiver 820, as described in FIG. 6 and FIG. 7, signals 651 and 653 in another frequency band other than the signal 652 in the desired frequency band may be inputted to the FEM 830.

The PAM 831 of the FEM 830 may amplify not only the signal 652 in the desired frequency band but also the signals 651 and 653 in the other undesired frequency band. In the BPF 832, the signals 651 and 653 in the undesired frequency band may be filtered, and the filtered signals may inputted to the PAM 831 again as reflected wave signals (returning signals) and may cause damage to the PAM 831.

According to an embodiment, the electronic device 800 (e.g., the CP 810 or the transceiver 820) may identify whether the transmission signal (the first signal) is abnormal based on a signal fed back via the coupler 840. If it is identified that the transmitted signal is abnormal, the electronic device 800 may adjust transmission power of the transmission signal (for example, decrease the transmission power, or stop transmission) during a set time interval, or control a setting of the transceiver 820 (for example, control a setting of a memory included in the transceiver 820, or change a carrier frequency ($f_c$) of the transmission signal). According to an embodiment, if most of the signal inputted to the BPF 832 is filtered, and the feedback signal inputted to the transceiver 820 does not reach a reference value, the electronic device 800 may identify that a signal in the unwanted frequency band is outputted, and accordingly, may identify that the transmission signal is abnormal.

According to an embodiment, if the transceiver 820 receives a feedback signal from the coupler 840 and identifies that the transmission signal is abnormal based on the feedback signal, the transceiver 820 may control to initialize or reset a setting of the memory included in the transceiver 820 or may control to change a carrier frequency ($f_c$) of the transmission signal. According to an embodiment, the transceiver 820 may generate a control signal itself and control to initialize or reset the setting of the memory, or control to change the carrier frequency ($f_c$) of the transmission signal.

According to an embodiment, the electronic device 800 may transmit a signal fed back via the coupler 840 to the transceiver 820. According to an embodiment, the signal fed back via the coupler 840 may be inputted to a feedback port (FBRX) or a power determination port (PDET) of the transceiver 820.

According to an embodiment, the fed back signal may be relatively small compared to the signal that has passed through the coupler 840 and is transmitted to the antenna 850, so the feedback signal processing module 823 of the CP 810 may receive and amplify the signal fed back from the coupler 840. The signal amplified via the feedback signal processing module 823 may be transmitted to the digital signal processing module 824.

According to an embodiment, the digital signal processing module 824 may digital signal-process the signal received from the feedback signal processing module 823 and transmit the digital signal-processed signal to the CP 810. If the digital signal-processed signal received from the digital signal processing module 824 satisfies a set condition, the power control module 811 of the CP 810 may identify that the first signal to be transmitted is abnormal.

According to an embodiment, the digital signal processing module 824 may digital signal-process a signal received from the feedback signal processing module 823, convert the digital signal-processed signal into a set parameter value, and transmit the converted parameter value to the power control module 811. According to an embodiment, if the parameter value received from the digital signal processing module 824 satisfies a set condition, the power control module 811 may identify that the first signal is abnormal.

According to an embodiment, if the first signal is identified to be abnormal based on the signal or the parameter value received from the digital signal processing module 824, the power control module 811 may adjust transmission power of the first signal during a set time interval. According to an embodiment, if the first signal is identified to be abnormal, the power control module 811 may control to decrease the transmission power of the first signal during a first time interval. According to an embodiment, if the first signal is identified to be abnormal, the power control module 811 may control to stop transmission of the first signal during a second time interval. According to an embodiment, if the first signal is identified to be restored again to the normal state from an abnormal signal, the power control module 811 may control to output normally the transmission power of the first signal.

According to an embodiment, if the first signal is identified to be abnormal based on the signal or the parameter value received from the digital signal processing module 824, the power control module 811 may transmit a control signal related to a setting of a memory included in the transceiver 820 to the transceiver 820. According to an embodiment, the control signal related to the setting of the memory may include a control signal for checking a registry setting of the memory included in the transceiver 820. According to an embodiment, the control signal related to the setting of the memory may include a control signal for instructing to reset the registry of the memory included in the transceiver 820.

According to an embodiment, the transceiver 820 may receive a control signal from the CP 810 to control power of a transmission signal or perform an operation related to a setting of a memory. According to an embodiment, the transceiver 820 may receive the control signal from the CP 810 and identify whether a register setting of the memory is normal. According to an embodiment, the transceiver 820 may receive the control signal from the CP 810 and perform a memory self check operation to reprogram the memory. According to an embodiment, according to the memory self-check operation, the transceiver 820 may perform a memory refresh of the transceiver 820 or may check a currently configured value via RFIC reprogramming which is performed when a resource block (RB) is changed. The memory check may eliminate the reason for the frequency signals causing the abnormal operation.

Figure 9:
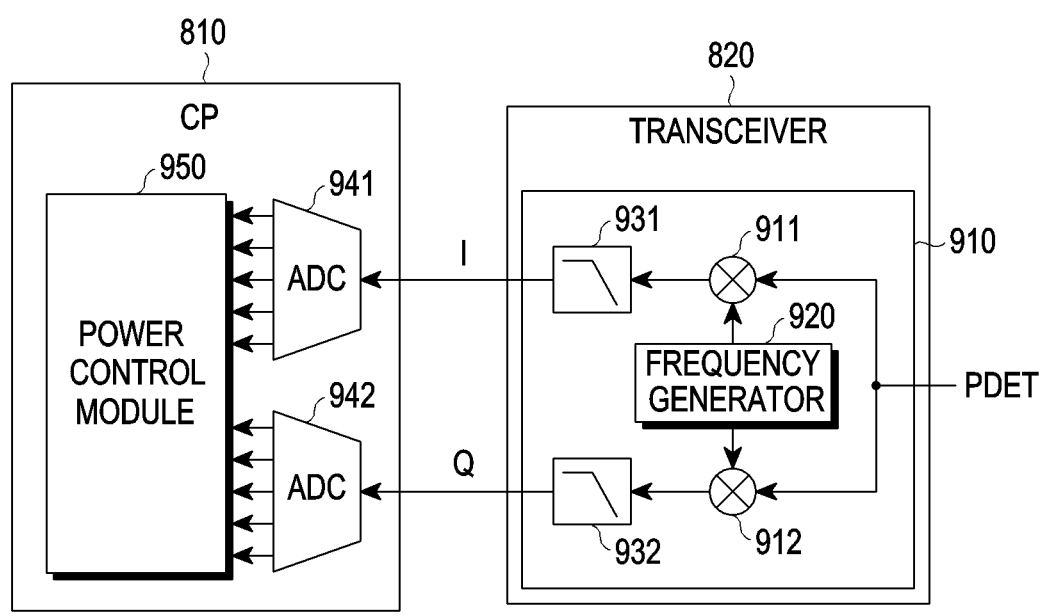
FIG. 9 is a circuit diagram illustrating a detailed structure of a communication processor and a transceiver according to an embodiment.

FIG. 9 is a circuit diagram illustrating a detailed structure of a communication processor and a transceiver according to an embodiment. Referring to FIG. 9, according to an embodiment, a feedback signal processing module 910 of a transceiver 820 may include a first mixer 911, a second mixer 912, a frequency generator 920, a first low pass filter (LPF) 931, or a second LPF 932. A communication processor 810 may include a power control module 950 (e.g., a power control module 811 in FIG. 8), a first analog to digital converter (ADC) 941, or a second ADC 942.

According to an embodiment, a signal received via the PDET port of the transceiver 820 may be input to the first mixer 911 and the second mixer 912 of the feedback signal processing module 910. The first mixer 911 and the second mixer 912 may receive a signal which corresponds to the frequency of a first communication signal from the frequency generator 920, and may perform a mixing operation to output a baseband signal (e.g., I and Q signals) of the first signal. The output signals of the first mixer 911 and the second mixer 912 may go through low-pass filtering via the first LPF 931 and the second LPF 932, and may be transmitted to the communication processor 810.

According to an embodiment, the communication processor 810 may perform digital signal processing on an analog signal (I signal) outputted from the first LPF 931 by using the first ADC 941, and may transmit the same to the power control module 950. The communication processor 810 may perform digital signal processing on an analog signal (Q signal) outputted from the second LPF 932 by using the second ADC 942, and may transmit the same to the power control module 950.

According to an embodiment, the power control module 950 may analyze the signals received from the first ADC 941 and the second ADC 942, and may identify whether the first signal is abnormal. If it is identified that a set condition is satisfied based on the analyzed result for the signals received from the first ADC 941 and the second ADC 942, the power control module 950 may identify that the first signal to be transmitted is abnormal.

Figure 10:
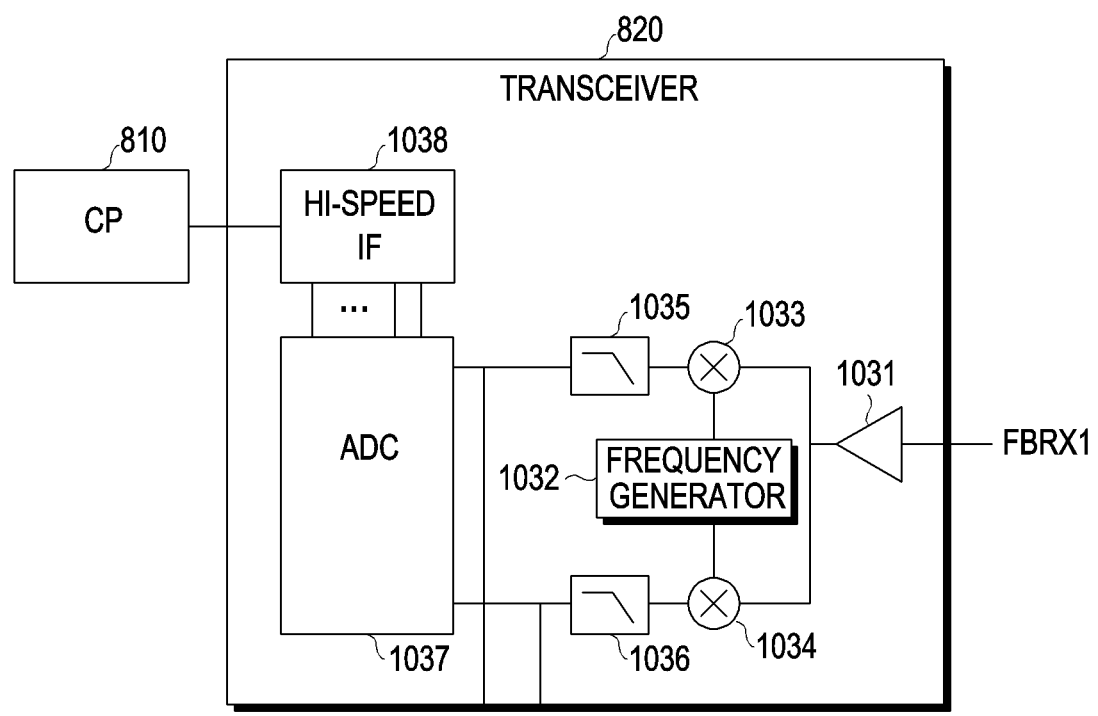
FIG. 10 is a circuit diagram illustrating a detailed structure of a communication processor and a transceiver according to an embodiment.

FIG. 10 is a block diagram illustrating a structure of a communication processor and a transceiver according to an embodiment. Referring to FIG. 10, a transceiver 820 may include an amplifier 1031, a first mixer 1033, a second mixer 1034, a frequency generator 1032, a first LPF 1035, a second LPF 1036, an ADC 1037, or a high-speed interface 1038.

According to an embodiment, a signal received via the FBRX1 port of the transceiver 820 may be amplified via the amplifier 1031, and may be inputted to the first mixer 1033 and the second mixer 1034. The first mixer 1033 and the second mixer 1034 may receive a signal which corresponds to the frequency of a first communication signal from the frequency generator 1032, and may perform a mixing operation to output a baseband signal (e.g., I, and Q signals) of the first signal. The output signals of the first mixer 1033 and the second mixer 1034 may go through low-pass filtering via the first LPF 1035 and the second LPF 1036, and may be digital signal processed by the ADC 1037.

According to an embodiment, the baseband I and Q signals which are digital-processed by the ADC 1037 may be transmitted to a CP 810 via the high-speed interface 1038.

According to an embodiment, a power control module 811 of the CP 810 may analyze a signal received from the transceiver 820 to identify whether the first signal is abnormal. If it is identified that a set condition is satisfied based on the analyzed result for the signal received from the transceiver 820, the power control module 811 may identify that the first signal to be transmitted is abnormal.

An electronic device according to one of an embodiment comprises an antenna, a transceiver configured to generate a first signal which corresponds to a first frequency band and transmit the first signal to the antenna, a coupler electrically connected to the antenna and the transceiver, and a communication processor operatively connected to the transceiver, and the communication processor may be configured to identify whether the first signal is abnormal, at least partially based on at least part of the first signal, wherein the at least part of the first signal is a signal fed back through the coupler, and based on identifying that the first signal is abnormal, control transmission power of the first signal during a set time interval.

According to an embodiment, the communication processor may be configured to, based on identifying that the first signal is abnormal, decrease the transmission power of the first signal during a first time interval.

According to an embodiment, the communication processor may be configured to, based on identifying that the first signal is abnormal, stop transmission of the first signal during a second time interval.

According to an embodiment, the communication processor may be configured to digital signal-process the at least part of the first signal, and identify that the first signal is abnormal based on the digital signal-processed signal satisfying a set condition.

According to an embodiment, the communication processor may be configured to digital signal-process the at least part of the first signal, convert the digital signal-processed signal into a set parameter value, and identify that the first signal is abnormal based on that the converted set parameter value satisfying a set condition.

According to an embodiment, the communication processor may be configured to, based on identifying that the first signal is restored to normal after detecting that the first signal is abnormal, restore the transmission power of the first signal to normal.

According to an embodiment, the communication processor may be configured to, based on identifying that the first signal is abnormal, transmit a control signal related to a setting of the transceiver to the transceiver.

According to various embodiments, the communication processor may be configured to, based on identifying that the first signal is abnormal, transmit a control signal for initializing the setting of the transceiver to the transceiver.

According to various embodiments, the communication processor may be configured to, based on identifying that the first signal is abnormal, transmit, to the transceiver, a control signal for instructing to reset a memory of the transceiver.

According to various embodiments, the communication processor may be configured to, based on identifying that the first signal is abnormal, transmit a control signal for changing a carrier frequency of the first signal to the transceiver.

An electronic device according to one of an embodiment comprises an antenna, a transceiver configured to generate a first signal which corresponds to a first frequency band and transmit the first signal to the antenna, a coupler electrically connected between the antenna and the transceiver, and a communication processor operatively connected to the transceiver, and the communication processor may be configured to identify whether the first signal is abnormal, at least partially based on at least part of the first signal, wherein the at least part of the signal is a signal fed back through the coupler, and, based on identifying that the first signal is abnormal, transmit a control signal related to a setting of a memory included in the transceiver to the transceiver.

According to various embodiments, the communication processor may be configured to, based on identifying that the first signal is abnormal, transmit a control signal for initializing the setting of the transceiver to the transceiver.

According to various embodiments, the communication processor may be configured to, based on identifying that the first signal is abnormal, transmit, to the transceiver, a control signal for instructing to reset a memory of the transceiver.

According to various embodiments, the communication processor may be configured to, based on identifying that the first signal is abnormal, transmit a control signal for changing a carrier frequency of the first signal to the transceiver.

Figure 11:
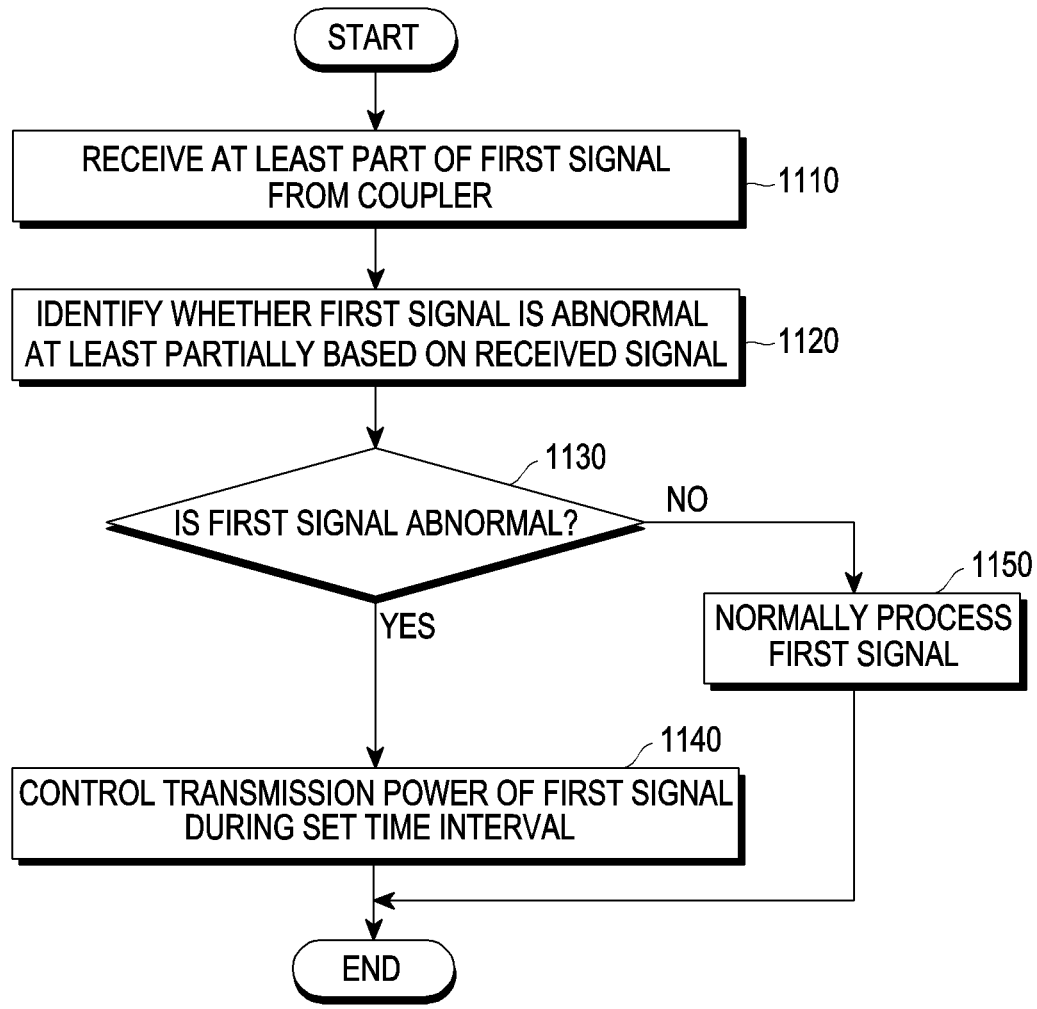
FIG. 11 is a flowchart for describing an operating method of an electronic device according to an embodiment.

FIG. 11 is a flowchart for describing an operating method of an electronic device according to an embodiment. According to an embodiment, an electronic device (e.g., an electronic device 101 in FIG. 1, FIG. 2A, or FIG. 2B, an electronic device 500 in FIG. 5, and an electronic device 600 in FIG. 6) may generate a first signal which corresponds to a first frequency band and transmit the first signal to an antenna via a transceiver.

In operation 1110, the electronic device may receive at least part of the first signal. The at least part of the first signal is a signal fed back via a coupler electrically connected between the antenna and the transceiver.

In operation 1120, the electronic device (e.g., a communication processor 810) may identify whether the first signal is abnormal, at least partially based on the at least part of the first signal. According to an embodiment, the electronic device may digital signal-process the at least part of the first signal, and identify that the first signal is abnormal if the digital signal-processed signal satisfies a set condition. According to an embodiment, the electronic device may digital signal-process the at least part of the first signal, convert the digital signal-processed signal into a set parameter value, and identify that the first signal is abnormal if the converted parameter value satisfies a set condition.

In operation 1130, if the first signal is identified to be abnormal (1130—Y), the electronic device may control transmission power of the first signal during a set time interval in operation 1140. According to an embodiment, the operation of controlling the transmission power may include an operation of controlling to decrease the transmission power of the first signal during first time interval if the first signal is identified to be abnormal. According to an embodiment, the operation of controlling the transmission power may include an operation of controlling to stop transmission of the first signal during second time interval if the first signal is identified to be abnormal.

In operation 1130, if it is identified that the first signal is not abnormal (1130—N), the electronic device may normally process the first signal in operation 1150.

Figure 12:
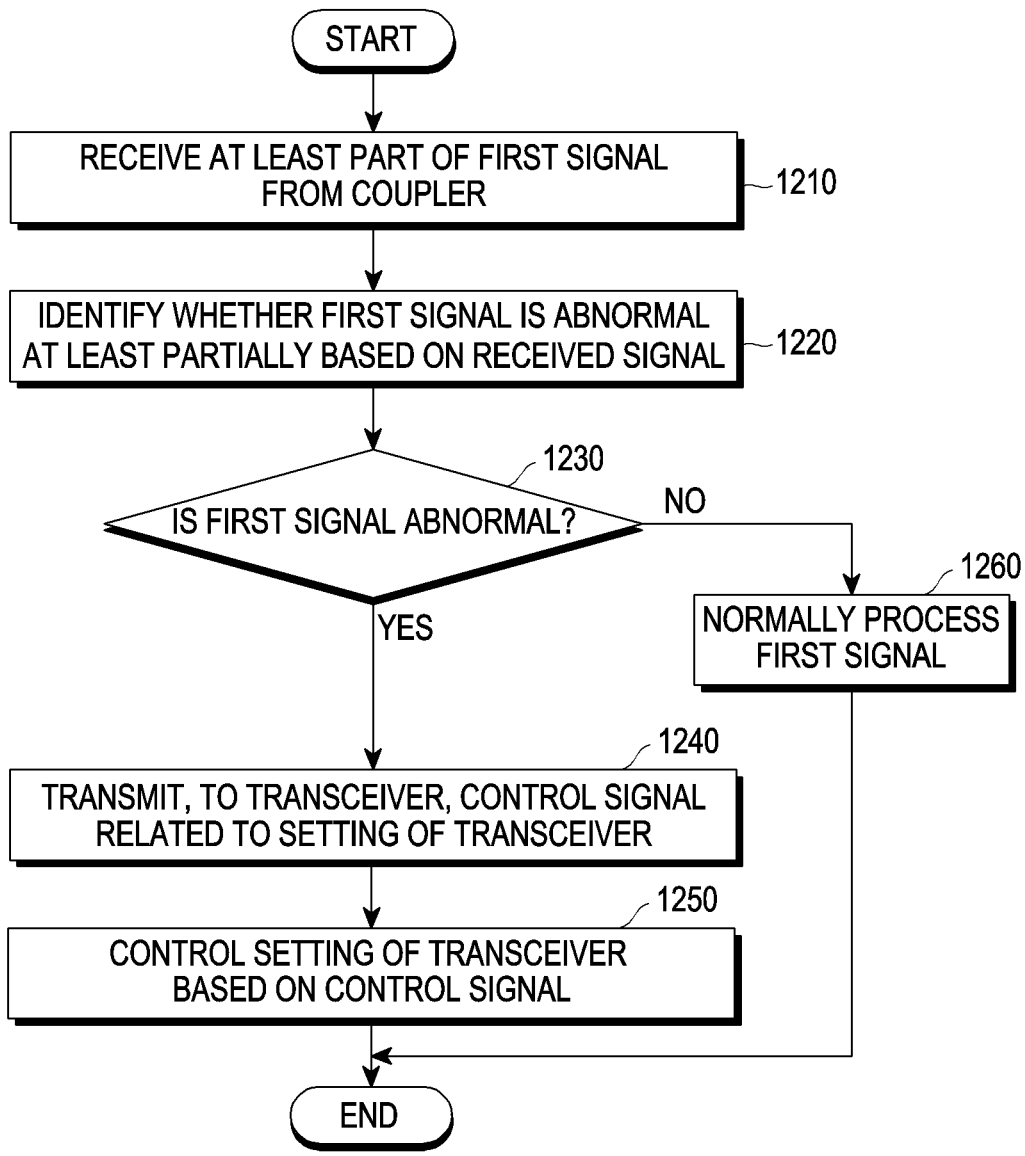
FIG. 12 is a flowchart for describing an operating method of an electronic device according to an embodiment.

FIG. 12 is a flowchart for describing an operating method of an electronic device according to an embodiment. According to an embodiment, an electronic device (e.g., an electronic device 101 in FIG. 1, FIG. 2A, or FIG. 2B, an electronic device 500 in FIG. 5, and an electronic device 600 in FIG. 6) may generate a first signal which corresponds to a first frequency band and transmit the first signal to an antenna via a transceiver.

In operation 1210, the electronic device may receive at least part of the first signal. The at least part of the first signal is a signal fed back through a coupler electrically connected between the antenna and the transceiver.

In operation 1220, the electronic device (e.g., a communication processor 810) may identify whether the first signal is abnormal, at least partially based on the at least part of the first signal. According to an embodiment, the electronic device may digital signal-process the at least part of the first signal, and identify that the first signal is abnormal if the digital signal-processed signal satisfies a set condition. According to an embodiment, the electronic device may digital signal-process the at least part of the first signal, convert the digital signal-processed signal into a set parameter value, and identify that the first signal is abnormal if the converted parameter value satisfies a set condition.

In operation 1230, if the first signal is identified to be abnormal (1230—Y), the electronic device may transmit a control signal related to a setting of the transceiver to the transceiver in operation 1240. According to an embodiment, if the first signal is identified to be abnormal, the electronic device may transmit a control signal for checking a registry setting of a memory to the transceiver. According to an embodiment, if the first signal is identified to be abnormal, the electronic device may transmit, to the transceiver, a control signal instructing to initialize or reset a setting of the memory included in the transceiver, or change a carrier frequency ($f_c$) of a transmission signal. In operation 1240, the electronic device may control the setting of the transceiver based on the control signal. According to an embodiment, the electronic device may initialize or reset the setting of the memory included in the transceiver, or change the carrier frequency ($f_c$) of the transmission signal, based on the control signal.

In operation 1230, if it is identified that the first signal is not abnormal (1230—N), the electronic device may normally process the first signal in operation 1260.

Figure 13:
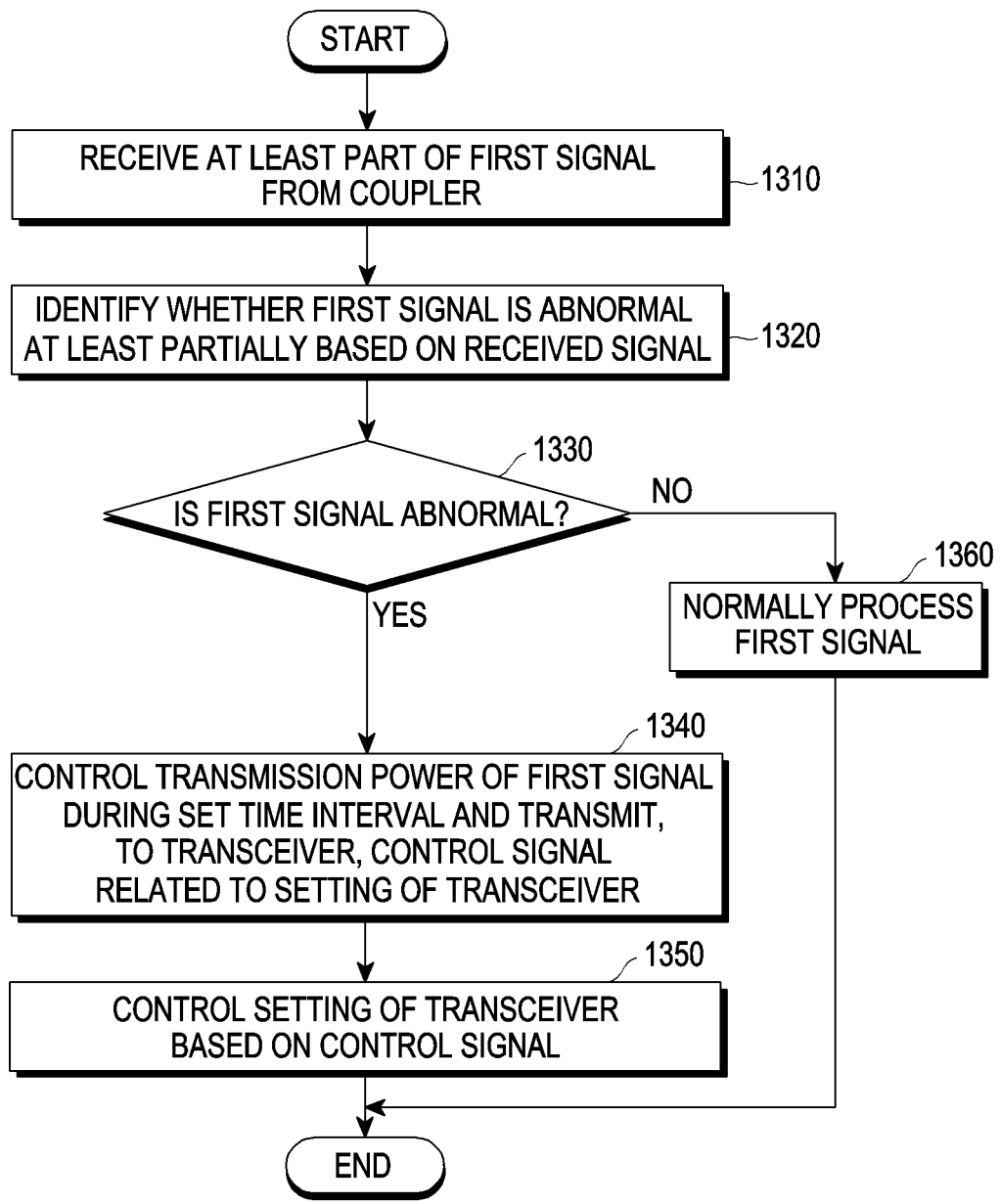
FIG. 13 is a flowchart for describing an operating method of an electronic device according to an embodiment.

FIG. 13 is a flowchart for describing an operating method of an electronic device according to an embodiment. According to an embodiment, an electronic device (e.g., an electronic device 101 in FIG. 1, FIG. 2A, or FIG. 2B, an electronic device 500 in FIG. 5, and an electronic device 600 in FIG. 6) may generate a first signal which corresponds to a first frequency band and transmit the first signal to an antenna via a transceiver.

In operation 1310, the electronic device may receive at least part of the first signal. The at least part of the first signal is a signal fed back through a coupler electrically connected between the antenna and the transceiver.

In operation 1320, the electronic device (e.g., a communication processor 810) may identify whether the first signal is abnormal, at least partially based on the at least part of the first signal. According to an embodiment, the electronic device may digital signal-process the at least part of the first signal, and identify that the first signal is abnormal if the digital signal-processed signal satisfies a set condition. According to an embodiment, the electronic device may digital signal-process the at least part of the first signal, convert the digital signal-processed signal into a set parameter value, and identify that the first signal is abnormal if the converted parameter value satisfies a set condition.

In operation 1330, if the first signal is identified to be abnormal (1330—Y), the electronic device, in operation 1340, may control transmission power of the first signal during a set time interval and transmit a control signal related to a setting of the transceiver to the transceiver.

According to an embodiment, the operation of controlling the transmission power may include an operation of controlling to decrease the transmission power of the first signal during first time interval if the first signal is identified to be abnormal. According to an embodiment, the operation of controlling the transmission power may include an operation of controlling to stop transmission of the first signal during second time interval if the first signal is identified to be abnormal.

According to an embodiment, if the first signal is identified to be abnormal, the electronic device may transmit, to the transceiver, a control signal instructing to initialize or reset a setting of a memory included in the transceiver, or change a carrier frequency ($f_c$) of a transmission signal.

In operation 1340, the electronic device may control a setting of the transceiver based on the control signal. According to an embodiment, operation 1340 and operation 1350 may be performed sequentially or at the same time. For example, if the first signal is identified to be abnormal, the electronic device may change the setting of the transceiver after controlling the transmission power of the first signal. Alternatively, the electronic device may control the transmission power of the first signal after changing the setting of the transceiver. In operation 1330, if it is identified that the first signal is not abnormal (1330—N), the electronic device may normally process the first signal in operation 1360.

A method to protect a front end module in an electronic device according to one of various embodiments may comprise generating, by a transceiver, a first signal which corresponds to a first frequency band and transmitting the first signal to an antenna, receiving at least part of the first signal, wherein the at least part of the first signal is a signal fed back through a coupler electrically connected between the antenna and the transceiver, identifying whether the first signal is abnormal, at least partially based on the at least part of the first signal, and, based on identifying that the first signal is abnormal, adjusting transmission power of the first signal during a set time interval.

According to an embodiment, the operation of adjusting the transmission power may comprise, based on identifying that the first signal is abnormal, an operation of controlling to decrease the transmission power of the first signal during a first time interval.

According to an embodiment, the operation of adjusting the transmission power may comprise, based on identifying that the first signal is abnormal, an operation of controlling to stop transmission of the first signal during a second time interval.

According to an embodiment, the method may comprise digital signal-processing the at least part of the first signal, and identifying that the first signal is abnormal based on identifying that the digital signal-processed signal satisfying a set condition.

According to an embodiment, the method may comprise digital signal-processing the at least part of the first signal, converting the digital signal-processed signal into a set parameter value, and identifying that the first signal is abnormal based on identifying that the converted set parameter value satisfying a set condition.

According to an embodiment, the method may further comprise, based on identifying that the first signal is restored to normal state after detecting that the first signal is abnormal, restoring the transmission power of the first signal to normal.

A method to protect a front end module in an electronic device according to one of various embodiments may comprise generating, by a transceiver, a first signal which corresponds to a first frequency band and transmitting the first signal to an antenna, receiving at least part of the first signal, wherein the at least part of the first signal is a signal fed back through a coupler electrically connected between the antenna and the transceiver, identifying whether the first signal is abnormal, at least partially based on the at least part of the first signal, and, based on identifying that the first signal is abnormal, transmitting a control signal related to a setting of the transceiver to the transceiver.

According to an embodiment, the control signal may be for initializing the setting of the transceiver.

According to an embodiment, the control signal may be for instructing to reset a memory of the transceiver.

According to an embodiment, the control signal may be for changing a carrier frequency of the first signal.

According to an embodiment, the method may further comprise, based on identifying that the first signal is abnormal, adjusting transmission power of the first signal during a set time interval.

According to an embodiment, the method may further comprise, based on identifying that the first signal is abnormal, controlling to decrease transmission power of the first signal during a first time interval.

Certain embodiments disclosed herein may prevent damage to a PA which may occur due to a reflected wave which fails to pass a band pass filter by controlling transmission power if the electronic device is incapable of generating a normal signal in the desired frequency band.

Certain embodiments disclosed herein may prevent damage to a PA which may occur due to a reflected wave which fails to pass a band pass filter by controlling a memory setting of a transceiver if the electronic device is incapable of generating a normal signal in the desired frequency band.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
    an antenna;
    a transceiver configured to generate a first signal which corresponds to a first frequency band and transmit the first signal to the antenna via a front end module having a power amplifier module and a filter, wherein the power amplifier module is configured to amplify the first signal and feed the amplified first signal to the filter;
    a coupler electrically connected to the antenna and the transceiver; and
    a communication processor operatively connected to the transceiver,
    wherein the communication processor is configured to:
        identify whether the first signal is abnormal, at least partially based on at least part of the first signal, wherein the at least part of the first signal is a signal fed back through the coupler; and
        based on identifying that the first signal is abnormal, control transmission power of the first signal during a set time interval,
    wherein the first signal is abnormal when at least one portion of the amplified first signal rejected by the filter is reflected back to the power amplifier module.

2. The electronic device of claim 1, wherein the communication processor is further configured to:
    based on identifying that the first signal is abnormal, decrease the transmission power of the first signal during a first time interval.

3. The electronic device of claim 1, wherein the communication processor is further configured to:
    based on identifying that the first signal is abnormal, stop transmission of the first signal during a second time interval.

4. The electronic device of claim 1, wherein the communication processor is further configured to:
    digital signal-process the at least part of the first signal, and identify that the first signal is abnormal based on the digital signal-processed signal satisfying a set condition.

5. The electronic device of claim 1, wherein the communication processor is further configured to:
    digital signal-process the at least part of the first signal, convert the digital signal-processed signal into a set parameter value, and identify that the first signal is abnormal based on the converted set parameter value satisfying a set condition.

6. The electronic device of claim 5, wherein the set parameter value includes a parameter "h_db" related to a hardware block, a parameter "f_db" related to a firmware block, and a parameter "1s error" indicating a least square error.

7. The electronic device of claim 1, wherein the communication processor is further configured to:
    based on identifying that the first signal is restored to normal after detecting that the first signal is abnormal, restore the transmission power of the first signal to normal.

8. The electronic device of claim 1, wherein the communication processor is further configured to:
    based on identifying that the first signal is abnormal, transmit a control signal related to a setting of the transceiver to the transceiver.

9. The electronic device of claim 8, wherein the communication processor is configured to:
    based on identifying that the first signal is abnormal, transmit a control signal for initializing the setting of the transceiver to the transceiver.

10. The electronic device of claim 7, wherein the communication processor is configured to:
    based on identifying that the first signal is abnormal, transmit, to the transceiver, a control signal for instructing to reset a memory of the transceiver.

11. The electronic device of claim 7, wherein the communication processor is configured to:
    based on identifying that the first signal is abnormal, transmit a control signal for changing a carrier frequency of the first signal to the transceiver.

12. An electronic device, comprising:
    an antenna;
    a transceiver configured to generate a first signal which corresponds to a first frequency band and transmit the first signal to the antenna via a front end module having a power amplifier module and a filter, wherein the power amplifier module is configured to amplify the first signal and feed the amplified first signal to the filter;
    a coupler electrically connected between the antenna and the transceiver; and
    a communication processor operatively connected to the transceiver, wherein the communication processor is configured to:

identify whether the first signal is abnormal, at least partially based on at least part of the first signal, wherein the at least part of the first signal is a signal fed back through the coupler; and based on identifying that the first signal is abnormal, transmit a control signal related to a setting of the transceiver to the transceiver, wherein the first signal is abnormal when at least one portion of the amplified first signal rejected by the filter is reflected back to the power amplifier module.

13. The electronic device of claim 12, wherein the control signal is for initializing the setting of the transceiver.

14. The electronic device of claim 12, wherein the control signal is for instructing to reset a memory of the transceiver.

15. The electronic device of claim 12, wherein the control signal is for changing a carrier frequency of the first signal.

16. A method to control a communication circuit in an electronic device, the method comprising:

generating, by a transceiver, a first signal which corresponds to a first frequency band and transmitting the first signal to an antenna via a front end module having a power amplifier module and a filter, wherein the power amplifier module is configured to amplify the first signal and feed the amplified first signal to the filter;

receiving at least part of the first signal, wherein the at least part of the first signal is a signal fed back through a coupler electrically connected between the antenna and the transceiver;

identifying whether the first signal is abnormal, at least partially based on the at least part of the first signal; and based on identifying that the first signal is abnormal, transmitting a control signal related to a setting of the transceiver to the transceiver, wherein the first signal is abnormal when at least one portion of the amplified first signal rejected by the filter is reflected back to the power amplifier module.

17. The method of claim 16, wherein the control signal is for initializing the setting of the transceiver.

18. The method of claim 16, wherein the control signal is for instructing to reset a memory of the transceiver.

19. The method of claim 16, wherein the control signal is for changing a carrier frequency of the first signal.

20. The method of claim 16, further comprising:
based on identifying that the first signal is abnormal, adjusting transmission power of the first signal during a set time interval.

21. The method of claim 16, further comprising:
based on identifying that the first signal is abnormal, controlling to decrease transmission power of the first signal during a first time interval.

* * * * *